US012811629B2

(12) United States Patent
Alabbasi et al.

(10) Patent No.: US 12,811,629 B2
(45) Date of Patent: Nov. 24, 2026

(54) METHOD, DEVICE AND SYSTEM FOR ENABLING COMMUNICATION

(71) Applicant: Telefonaktiebolaget LM Ericsson (PUBL), Stockholm (SE)

(72) Inventors: Abdulrahman Alabbasi, Kista (SE); Alexandros Palaios, Herzogenrath (DE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 285 days.

(21) Appl. No.: 18/834,156

(22) PCT Filed: Jan. 27, 2023

(86) PCT No.: PCT/SE2023/050071

§ 371 (c)(1),
(2) Date: Jul. 29, 2024

(87) PCT Pub. No.: WO2023/149828

PCT Pub. Date: Aug. 10, 2023

(65) Prior Publication Data

US 2025/0105880 A1 Mar. 27, 2025

(30) Foreign Application Priority Data

Feb. 2, 2022 (GR) .............................. 20220100105

(51) Int. Cl.
*H04W 24/10* (2009.01)
*H04B 7/04* (2017.01)

(52) U.S. Cl.
CPC ........ *H04B 7/04013* (2023.05); *H04W 24/10* (2013.01)

(58) Field of Classification Search
CPC ................. H04W 24/10; H04B 1/0475; H04B 2001/045; H04B 7/04013; H04B 7/15528
(Continued)

(56) References Cited

U.S. PATENT DOCUMENTS 11,233,426 B2 * 1/2022 Yeo ......................... H02J 50/90
12,160,285 B2 * 12/2024 Åström .............. H04B 7/04013
(Continued)

FOREIGN PATENT DOCUMENTS

WO WO2021045916 A1 3/2021

OTHER PUBLICATIONS

Jun Zhao et al. "A Survey of Intelligent Reflecting Surfaces (IRSs): Towards 6G Wireless Communication Networks", Nov. 2, 2019.
(Continued)

*Primary Examiner* — Joseph Arevalo
(74) *Attorney, Agent, or Firm* — Baker Botts L.L.P.

(57) ABSTRACT

A device (101) for enabling a communication between a Base Station, BS, (100) and a UE (110) comprising a first sheet (102) comprising one or more elements (102*a*) for interacting with one or more signals in the form of Electromagnetic waves, EM, a controller circuitry (104), wherein the controller circuitry (104) comprises a memory (106) and a processor (107), the memory comprising instructions which when executed by the processor cause the device (101) to: receive a first message comprising a first configuration information for the device (101); obtain a second configuration information based on at least the first configuration information and a first power division factor; configure the first sheet based on the second configuration information to divide the energy propagated by an incident signal in the form of an EM wave into a first energy and a second energy; and send a second message comprising the second configuration information.

20 Claims, 9 Drawing Sheets

(58) Field of Classification Search
USPC ............. 455/420, 84, 422.1, 41.2, 456.1, 39
See application file for complete search history.

(56) References Cited

U.S. PATENT DOCUMENTS

| | | | | |
|---|---|---|---|---|
| 12,355,509 | B2 * | 7/2025 | Haghighat | H04B 7/0632 |
| 12,366,632 | B2 * | 7/2025 | Kumari | G01S 13/75 |
| 2018/0098370 | A1 | 4/2018 | Bangolae et al. | |
| 2021/0153063 | A1 | 5/2021 | Zhang et al. | |
| 2023/0087862 | A1 * | 3/2023 | Dai | H04B 7/026 370/315 |
| 2023/0308139 | A1 * | 9/2023 | Baligh | H04B 7/04013 |
| 2023/0308140 | A1 * | 9/2023 | Baligh | H04B 7/04013 |
| 2023/0337269 | A1 * | 10/2023 | Rao | H04B 7/06952 |
| 2024/0154647 | A1 * | 5/2024 | Elshafie | H04L 5/14 |
| 2024/0250747 | A1 * | 7/2024 | Li | H04B 7/026 |
| 2024/0349369 | A1 * | 10/2024 | Hui | H04W 52/42 |
| 2024/0388326 | A1 * | 11/2024 | Haghighat | H04B 17/328 |
| 2024/0413868 | A1 * | 12/2024 | Haghighat | H04L 25/0204 |

OTHER PUBLICATIONS

Qingqing Wu et al. "Beamforming Optimization for Intelligent Reflecting Surface with Discrete Phase Shifts", Oct. 26, 2018.
Wingqing Wu et al. "Intelligent Reflecting Surface Aided Wireless Communications: A Tutorial", Jul. 7, 2020.
Jinghe Wang et al. "Interplay between RIS and AI in Wireless Communications: Fundamentals, Architectures, Applications, and Open Research Problems", Jan. 1, 2021.
Steven Kisseleff et al. "Reconfigurable Intelligent Surfaces in Challenging Environments: Underwater, Underground, Industrial and Disaster", Feb. 23, 2021.
PCT International Search Report issued for International application No. PCT/SE2023/050071—Jul. 17, 2023.
Konstantinos Ntontin et al. "Toward Autonomous Reconfigurable Intelligent Surfaces Through Wireless Energy Harvesting", Aug. 18, 2021.
PCT Written Opinion of the International Searching Authority issued for International application No. PCT/SE2023/050071—Jul. 17, 2023.

* cited by examiner

METHOD, DEVICE AND SYSTEM FOR ENABLING COMMUNICATION

PRIORITY

This nonprovisional application is a U.S. National Stage Filing under 35 U.S.C. § 371 of International Patent Application Serial No. PCT/SE2023/050071 filed Jan. 27, 2023 and entitled "Method, Device and System for Enabling Communication" which claims priority to Greek patent application No. 20220100105 filed Feb. 2, 2022, both of which are hereby incorporated by reference in their entirety.

TECHNICAL FIELD

The invention relates to methods for enabling communication. More specifically, the invention relates to a device, a base station and their corresponding methods, a communication system, computer programs, carriers and computer program products.

BACKGROUND

Industry 4.0 enables significant transformation in the way goods are produced and delivered moving towards industrial automation and the so called 'flexible factory'. Some of the requirements of Industry 4.0 from a wireless connectivity perspective are as follows:

- Enable monitoring and data collection. An example scenario is to optimize future milling, which requires high data rate and short end-to-end latency.
- Enable real-time control to adjust a process in motion, for example by altering the milling tool spinning speed, which requires high data rate and short end-to-end latency.
- Enable a fully automated factory. Here, the total number of connected devices can be combined and managed as one ecosystem
- Enable flexible and dynamic installation of robots, AVGs, machineries, at low cost.

From the above, it is clear that wireless connectivity and communication enablement is crucial for the seamless functioning of an Industry 4.0 environment.

In a factory or an industrial plant environment, the wireless channel is typically weakened by large number of blockers or obstacles. The large number of blockers weaken the strength of the transmitted signals and further cause an increased signal interference.

The presence of large number of obstacles results in signals being randomly reflected away from a target receiver such as, an end-user device. In a factory automation environment, full automation requires flexibility in placing one or more communication nodes which are to be connected via a wireless link i.e. requiring the nodes to be positioned even in places behind the signal blocker. Such a blocker environment blocks the link from a transmitter, e.g. a base station, to an end-device node, e.g. a UE.

Multiple reflected signals may even get directed to a neighboring communication network and may cause increased interference. The signal may also leak into areas outside the premise of operation leading to security issues.

Another scenario describing a problem is in a modern factory, an industrial mine, or an indoor environment, with high density of blockers. If an owner of such place requires to deploy Ultra-Reliable Low Latency Communication (URLLC) features, then high system efficiency, low latency, low cost, and high spectral efficiency is required. However, due to a high density of blockers, one or more of the following problem occurs:

- Reduction in system capacity, e.g. throughput, latency, number of users.
- Need for purchasing large bandwidth by the factory owner.
- Higher energy consumption.

Furthermore, when reflection of signals occur, network designers may optimize the signal beam by changing its weight via techniques such as adaptive beamforming or relaying, to increase the capacity. However, such designs will cost the network huge amounts of energy consumption, which causes environmental problems.

Reconfigurable Intelligent Surfaces (RISs) are reconfigurable sheets of electromagnetic material that intentionally control the propagation environment in order to enhance the signal quality at the receiver, as can be found described in Q. Wu and R. Zhang, "Beamforming Optimization for Intelligent Reflecting Surface with Discrete Phase Shifts," ICASSP 2019-2019 IEEE International Conference on Acoustics, Speech and Signal Processing (ICASSP), Brighton, United Kingdom, 2019 and J. Zhao, Y. Liu, "A Survey of Intelligent Reflecting Surfaces (IRSs): Towards 6G Wireless Communication Networks".

SUMMARY

An object of the invention is to enable improved communication between a base station and at least a UE.

To achieve the object, according to a first aspect, there is provided a device for enabling a communication between a Base Station (BS) and one or more User Equipment (UE) comprising a first sheet comprising one or more elements for interacting with one or more signals in the form of Electromagnetic waves (EM) a controller circuitry, wherein the controller circuitry comprises a memory and a processor, the memory comprising instructions which when executed by the processor cause the device to: receive from the BS, a first message comprising a first configuration information for the device; obtain a second configuration information for the device based on at least the first configuration information and a first power division factor; configure the first sheet based on the second configuration information to divide the energy propagated by an incident signal in the form of an EM wave into a first energy and a second energy, wherein the first energy is propagated as a reflected signal in the form of another EM wave towards a UE and the second energy is stored; and send to the BS, a second message comprising the second configuration information.

According to a second aspect, there is provided a method performed by a device for enabling a communication between a base station and a User Equipment (UE) comprising a first sheet comprising one or more elements for interacting with one or more signals in the form of Electromagnetic (EM) waves a controller circuitry, the method comprising: receiving from a Base station, BS, a first message comprising a first configuration information for the device; obtaining a second configuration information for the device based on at least the first configuration information and a first power division factor; configuring the first sheet based on the second configuration information to divide the energy propagated by an incident signal in the form of an EM wave into a first energy and a second energy, wherein the first energy is propagated as a reflected signal in the form of another EM wave towards a UE and the second energy is stored; and sending to the BS, the second configuration information.

Hereby is achieved by the first sheet comprising the one or more elements in the device that it requires much less power and processing requirements, e.g. encoding and decoding algorithms, compared to existing relaying and Multiple-Input Multiple-Output (MIMO) beamforming techniques.

Hereby is achieved by the first sheet comprising the one or more elements in the device that it converts non-line of sight signals into a virtual line of sight signal thereby increasing the signal to interference ratio and thus, the data throughput of the communication between the BS and at least a UE.

In an embodiment according to the first and second aspect, the device according to claim 1, wherein the controller circuitry comprises a memory and a processor, the memory comprising instructions which when executed by the processor cause the device to determine, by using an energy threshold value configured in the device, an amount of the second energy that is used to power the device.

Hereby is achieved that the energy threshold value enables a distribution of stored energy for a specific purpose, e.g. powering the device. Further is enabled energy harvesting capability in the communication system via the pre-configuration of energy threshold value in the device.

In an embodiment according to the first aspect and any of the above embodiments, wherein the controller circuitry comprises a memory and a processor, the memory comprising instructions which when executed by the processor cause the device to power the device using the second energy that is stored.

In an embodiment according to the first and second aspect and any of the above embodiments, wherein the second energy is stored in the energy storage unit in the device.

In an embodiment according to the first and second aspect and any of the above embodiments, wherein the second energy is stored in the BS.

In an embodiment according to the first aspect and any of the above embodiments, wherein the controller circuitry comprises a memory and a processor, the memory comprising instructions which when executed by the processor cause the device to divide the energy into the first energy and the second energy using a power divider unit.

Hereby is achieved that the power divider unit enables the device to determine signal characteristics of the signal transmitted by the BS and further assist the device to have an optimal configuration of the device for enabling communication between the BS and the UE.

In an embodiment according to the first aspect and any of the above embodiments, wherein the controller circuitry comprises a memory and a processor, the memory comprising instructions which when executed by the processor cause the device to divide the energy into a first energy and the second energy using a first power division factor controllable by the controller circuitry.

Hereby is achieved an independent control of the amplitude and the phase shift of the EM signal reflected from each element.

In an embodiment according to the first aspect and any of the above embodiments, wherein the controller circuitry comprises a memory and a processor, the memory comprising instructions which when executed by the processor cause the device to divide the energy into a first energy and the second energy using a first power division factor received from the BS.

In an embodiment according to the first and second aspect and any of the above embodiments, wherein the first power division factor is included in the first message.

In an embodiment according to the first and second aspect and any of the above embodiments, wherein the first configuration information comprises at least one of the following:

- Transmission, Tx, and Reception, Rx, Power of the UE;
- Tx and Rx power of the BS;
- Interference levels at the UE including Received Signal Radio Quality, RSRQ;
- Interference levels at the BS including Received Signal Radio Quality, RSRQ;
- UE Identity, ID, and UE geographical location;
- BS ID and BS geographical location;
- Target Quality of Service, QoS, requirements;
- Number of UE antenna and polarization information of each antenna;
- Number of BS antenna and polarization information of each antenna;
- Possible scheduling time of the UE;
- Data traffic information; and
- Scatter ratios of the one or more elements comprised in the first sheet.

In an embodiment according to the first aspect and any of the above embodiments, wherein the controller circuitry comprises a memory and a processor, the memory comprising instructions which when executed by the processor cause the device to obtain the second configuration information using a Machine Learning, ML model.

In an embodiment according to the first aspect and any of the above embodiments, wherein the controller circuitry comprises a memory and a processor, the memory comprising instructions which when executed by the processor cause the device to obtain the second configuration information using a ML model wherein the first configuration information and the first power division factor are inputs to the ML model.

In an embodiment according to the first aspect and any of the above embodiments, wherein the controller circuitry comprises a memory and a processor, the memory comprising instructions which when executed by the processor cause the device to obtain, from the BS, the second configuration information as an output of an ML model executed on the BS, wherein the first configuration information and the first power division factor are inputs to the ML model.

In an embodiment according to the first and second aspect and any of the above embodiments, wherein the second configuration information is at least one of the following:

- amplitude of the reflected signal per element of the first sheet;
- phase shift of the reflected signal per element of the first sheet;
- second power division factor.

Advantages of the embodiments of the aspects include at least one of the following:

- optimize reflection angle and amplitude of the reflected signal from the one or more elements to enhance at least one of throughput, reliability, latency, interference.
- reduce leakage of targeted signal, e.g. reflected signal, thereby increasing security
- improve energy efficiency of one or more UEs, e.g. in mines, by improving signal transmission.

In an embodiment according to the first and second aspect and any of the above embodiments, wherein the device is a wireless device.

In an embodiment according to the first and second aspect and any of the above embodiments, wherein the BS is a gNodeB, gNB.

In an embodiment according to the first and second aspect and any of the above embodiments, wherein the incident signal and the reflected signal are Radio Frequency, RF, signal.

In an embodiment according to the first and second aspect and any of the above embodiments, wherein the first sheet is a Reconfigurable Intelligent Surface, RIS, sheet.

In an embodiment according to the first and second aspect and any of the above embodiments, wherein the one or more elements are metal patches printed on a dielectric substrate.

In an embodiment according to the first aspect and any of the above embodiments, comprising a second sheet for interfacing between the first sheet and the controlling circuitry wherein the second sheet is made of at least copper.

In an embodiment according to the first aspect and any of the above embodiments, wherein the controller circuitry comprises a printed circuit board connecting the second sheet and the controller circuitry.

In one or more embodiments of the second aspect, the method performed by the device comprises any of the features of any one of the embodiments of the first aspect.

According to a third aspect, there is provided a Base Station (BS) communicating with a device for enabling a communication between the BS and at least a User Equipment (UE) comprising a memory and a processor, the memory comprising instructions which when executed by the processor cause the BS to: receive from the UE, a UE measurement report; generate a first configuration information for the device based on at least the UE measurement report; send to the device, a first message comprising the first configuration information; receive from the device, a second message comprising a second configuration information based on which the device is configured; and adapt the signal transmission of the BS towards the UE based on the second configuration information.

According to a fourth aspect, there is provided a method performed by a Base Station (BS) communicating with a device for enabling a communication between the BS and at least a User Equipment (UE), the method comprising: receiving from the UE, a UE measurement report; generating a first configuration information for a device based on at least the UE measurement report; sending to the device, a first message comprising the first configuration information; receiving from the device, a second message comprising a second configuration information based on which the device is configured; and adapting the signal transmission of the BS towards the UE based on the second configuration information.

Hereby is achieved a mechanism for making use of the device in the communication system to dynamically adapt the signal transmission between the BS and the one or more UEs based on the configuration information of the device. This enables in achieving better throughput, higher reliability, lesser interference, energy efficiency and increased signal quality.

In an embodiment according to the third aspect, the memory comprising instructions which when executed by the processor cause the BS to generate the first configuration information based on pre-configuration information of the device.

In an embodiment according to the third and fourth aspect and any of the embodiment according to the third and fourth aspects, wherein the first configuration information comprises at least one of the following:

Transmission, Tx, and Reception, Rx, Power of the UE;
Tx and Rx power of the BS;
Interference levels at the UE including Received Signal Radio Quality, RSRQ;
Interference levels at the BS including Received Signal Radio Quality, RSRQ;
UE Identity, ID, and UE geographical location;
BS ID and BS geographical location;
Target Quality of Service, QoS, requirements;
Number of UE antenna and polarization information of each antenna;
Number of BS antenna and polarization information of each antenna;
Possible scheduling time of the UE;
Data traffic information; and
Scatter ratios of the one or more elements of the device.

In an embodiment according to the third and fourth aspect and any of the embodiment according to the third and fourth aspects, wherein the first message comprises an energy threshold value.

Hereby is an advantage, that the energy threshold value enables a distribution of stored energy for a specific purpose, e.g. powering the device. Further is enabled energy harvesting capability in the communication system by sending the energy threshold value in a message to the device.

In an embodiment according to the third and fourth aspect and any of the embodiment according to the third and fourth aspects, comprising an energy storage unit to store the energy transmitted by the device.

In an embodiment according to the third and fourth aspect and any of the embodiment according to the third and fourth aspects, comprising an energy storage unit cause the BS to power the device using the energy stored.

In an embodiment according to the third and fourth aspect and any of the embodiment according to the third and fourth aspects, wherein the second configuration information is at least one of the following:

amplitude of the reflected signal per element of the first sheet;
phase shift of the reflected signal per element of the first sheet; and
second power division factor.

In an embodiment according to the third aspect and any of the embodiment according to the third and fourth aspects, the memory comprising instructions which when executed by the processor cause the BS to adapt the signal transmission by obtaining one or more Key Performance Indices, KPIs of the communication between the BS and the one or more UEs.

In an embodiment according to the third aspect and any of the embodiment according to the third and fourth aspects, the memory comprising instructions which when executed by the processor cause the BS to obtain the one or more KPIs by using a Machine Learning (ML) model wherein the input to the model is at least the second configuration information.

By this is achieved an effect that the BS is dynamically updated about the new configuration of the device based on the latest communication environment KPIs.

In an embodiment according to the third and fourth aspect and any of the embodiment according to the third and fourth aspects, wherein the KPI is at least one of: data throughput, reliability, latency, interference, and quality.

In one or more embodiments of the fourth aspect, the method performed by the BS comprises any of the features of any one of the embodiments of the third aspect.

According to a fifth aspect, there is provided a communication system comprising a device for enabling a communication between a base station and at least a UE comprising a first sheet comprising one or more elements for interacting with one or more signals in the form of Electromagnetic waves (EM) a controller circuitry; a Base Station (BS) communicating with a device for enabling a communication between the BS and at least a UE the communication system configured to: receive from the UE, a UE measurement report; generate a first configuration information for a device based on at least the UE measurement report; send to the device, a first message comprising the first configuration information; receive from a Base station, BS, a first message comprising a first configuration information for the device; obtain a second configuration information for the device based on at least the first configuration information and a first power division factor; configure the first sheet based on the second configuration information to divide the energy propagated by an incident signal in the form of an EM wave into a first energy and a second energy, wherein the first energy is propagated as a reflected signal in the form of another EM wave towards the UE and the second energy is stored; send, to the BS, the second configuration information; receive from the device, a second message comprising a second configuration information based on which the device is configured; and adapt the signal transmission of the BS (100) towards the UE based on the second configuration information.

According to a sixth aspect, there is provided a computer program, comprising instructions which, when executed on a device cause the device to carry out the method according to the second aspect or any of the embodiments according to the second aspect.

According to a seventh aspect, there is provided a carrier containing the computer program according to the sixth aspect, wherein the carrier is one of an electronic signal, optical signal, radio signal, or computer-readable storage medium.

According to an eighth aspect, there is provided a Computer program product comprising a computer readable storage means on which the computer program according to the sixth aspect is stored.

According to a ninth aspect, there is provided a computer program, comprising instructions which, when executed on a Base Station (BS) cause the BS to carry out the method according to the fourth aspect or any of the embodiments according to the fourth aspect.

According to a tenth aspect, there is provided a carrier containing the computer program according to the ninth aspect, wherein the carrier is one of an electronic signal, optical signal, radio signal, or computer-readable storage medium.

According to an eleventh aspect, there is provided a computer program product comprising a computer readable storage means on which the computer program according to the ninth aspect is stored.

Further advantages include but not limited to enabling improved connectivity and automation of e.g. a smart factory or an industrial plant while achieving low cost of deployment, high and efficient system capacity, and energy savings. Another advantage of the invention is enabling energy harvesting in a communication system.

DETAILED DESCRIPTION

In this application, the term "EM signal", unless specifically mentioned, is to be construed as a signal in the form of an EM wave. The signal may comprise data or information useful for communication. In this application, the terms "element" and "reflective element" may be used interchangeably.

Reconfigurable Intelligent Surfaces (RISs) are reconfigurable sheets of electromagnetic material that intentionally control the propagation environment in order to enhance the signal quality at the receiver. RISs are made of a large number of low-cost and passive elements that are capable of modifying the radio waves impinging upon them in the ways that naturally occurring materials are not capable of modifying.

Figure 1:
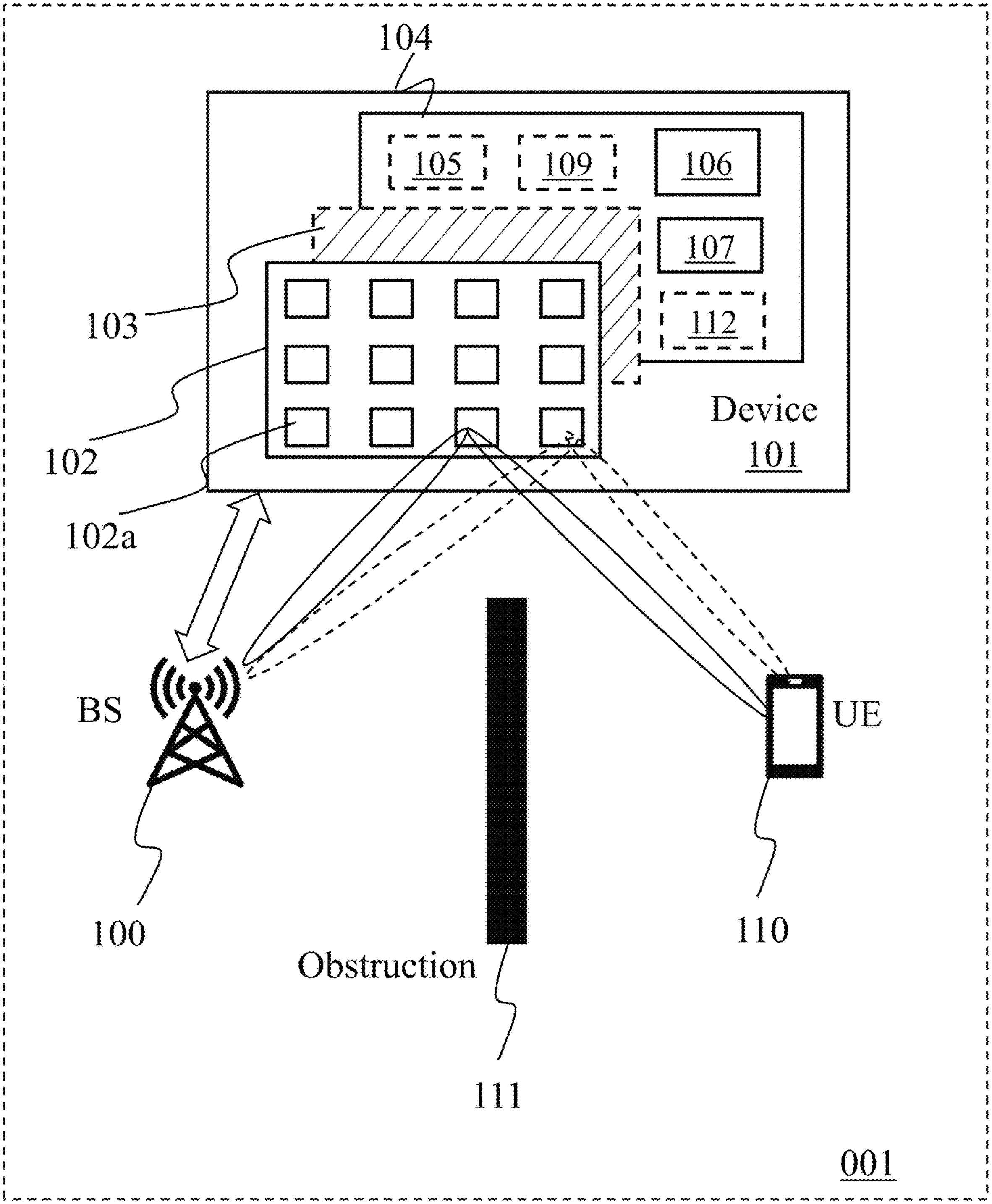
FIG. 1 illustrates a system 001 according to an embodiment of the invention.

FIG. 1 illustrates a communication system 001 according to an embodiment of the invention. The communication system comprises at least a Base Station (BS) 100, a User Equipment (UE) 110, a device 101 and an obstruction or an obstacle 111. The BS 100 may be a communication node capable of transmitting and receiving a communication message. The BS 100 may, for example, be a Third Generation Partnership Project (3GPP) cellular communication node such as a Fifth Generation (5G) node, a Long-Term Evolution (LTE) node, a Third Generation node (3G) or a Second Generation node (2G). The BS 100 may, for example, be a node belonging to the Sixth Generation (6G). More specifically, the BS 100 is a communication node in the Radio Access Network (RAN) of any one of the above communication networks. In an embodiment, the BS 100 is a gNodeB (gNB).

The BS 100 may also be a communication node operating in an Internet of Things (IoT) network or a Low Power Wide Area Network (LPWAN). In other words, the BS 100 may, for example, operate in any one of the 3GPP Narrowband IoT (NB-IoT), SigFox, LoRaWAN communication networks. Additionally or alternatively, the BS 100 is a communication node in the RAN of any of the above communication networks.

In an embodiment where the BS 100 is the gNB, the gNB may comprise both the gNB-Control Unit (gNB-CU) and the gNB-Distributed Unit (gNB-DU) in the BS 100. In another embodiment, the BS 100 is the gNB-DU wherein the gNB- CU resides in another radio node. In yet another embodiment, the BS 100 is the gNB-CU wherein the gNB-DU is deployed separately and the gNB-DU interacts with the UE 110 and the device 101. In each of the embodiments, the gNB-DU and the gNB-CU communicate with each other over the F1 interface.

The UE 110 may, for example, be a wireless device capable of communicating according to one or more 3GPP standards such as 6G, 5G, LTE, 3G and 2G. In other words, as an example, the UE 110 is a 5G UE.

The UE 110 in the form of an IoT device may be a device for use in one or more application domains, these domains comprising, but not limited to, home, city, wearable technology, extended reality, industrial application, and healthcare.

By way of example, the IoT device for a home, an office, a building or an infrastructure may be a baking scale, a coffee machine, a grill, a fridge, a refrigerator, a freezer, a microwave oven, an oven, a toaster, a water tap, a water heater, a water geyser, a sauna, a vacuum cleaner, a washer, a dryer, a dishwasher, a door, a window, a curtain, a blind, a furniture, a light bulb, a fan, an air-conditioner, a cooler, an air purifier, a humidifier, a speaker, a television, a laptop, a personal computer, a gaming console, a remote control, a vent, an iron, a steamer, a pressure cooker, a stove, an electric stove, a hair dryer, a hair styler, a mirror, a printer, a scanner, a photocopier, a projector, a hologram projector, a 3D printer, a drill, a hand-dryer, an alarm clock, a clock, a security camera, a smoke alarm, a fire alarm, a connected doorbell, an electronic door lock, a lawnmower, a thermostat, a plug, an irrigation control device, a flood sensor, a moisture sensor, a motion detector, a weather station, an electricity meter, a water meter, and a gas meter.

By further ways of example, the IoT device for use in a city, urban, or rural areas may be connected street lighting, a connected traffic light, a traffic camera, a connected road sign, an air control/monitor, a noise level detector, a transport congestion monitoring device, a transport controlling device, an automated toll payment device, a parking payment device, a sensor for monitoring parking usage, a traffic management device, a digital kiosk, a bin, an air quality monitoring sensor, a bridge condition monitoring sensor, a fire hydrant, a manhole sensor, a tarmac sensor, a water fountain sensor, a connected closed circuit television, a scooter, a hoverboard, a ticketing machine, a ticket barrier, a metro rail, a metro station device, a passenger information panel, an onboard camera, and other connected device on a public transport vehicle.

As further way of example, the IoT device may be a wearable device, or a device related to extended reality, wherein the device related to extended reality may be a device related to augmented reality, virtual reality, merged reality, or mixed reality. Examples of such IoT devices may be a smart-band, a tracker, a haptic glove, a haptic suit, a smartwatch, clothes, eyeglasses, a head mounted display, an ear pod, an activity monitor, a fitness monitor, a heart rate monitor, a ring, a key tracker, a blood glucose meter, and a pressure meter.

As further ways of example, the IoT device may be an industrial application device wherein an industrial application device may be an industrial unmanned aerial vehicle, an intelligent industrial robot, a vehicle assembly robot, and an automated guided vehicle.

As further ways of example, the IoT device may be a transportation vehicle, wherein a transportation vehicle may be a bicycle, a motor bike, a scooter, a moped, an auto rickshaw, a rail transport, a train, a tram, a bus, a car, a truck, an airplane, a boat, a ship, a ski board, a snowboard, a snow mobile, a hoverboard, a skateboard, roller-skates, a vehicle for freight transportation, a drone, a robot, a stratospheric aircraft, an aircraft, a helicopter and a hovercraft.

As further ways of example, the IoT device may be a health or fitness device, wherein a health or fitness device may be a surgical robot, an implantable medical device, a non-invasive medical device, and a stationary medical device which may be: an in-vitro diagnostic device, a radiology device, a diagnostic imaging device, and an x-ray device.

In an embodiment the UE 110 is an IoT device capable of communicating according to one or more of the following technologies: NB-IoT, Sigfox and LoRaWAN.

The device 101 enables communication between the BS 100 and the UE 110. The device 101 comprises a first sheet 102, a second sheet 103, a controller circuitry 104, a power divider unit 109. In an embodiment, the device 101 comprises an energy storage unit 105.

The first sheet 102 comprises one or more elements **102*a*** for interacting with one or more signals in the form the Electromagnetic, EM, wave. The non-limiting term 'interact with one or more signals' refers to at least one of: reflecting the one or more signals, absorbing the one or more signals, deflecting the one or more signals, transmitting the one or more signals and redirecting the one or more signals.

The first sheet 102 is the outer layer of the device 101. The one or more elements **102*a* are reflecting elements and are typically made of meta-atom. In an embodiment, the one or more elements 102*a*** are metallic patches that are printed on a dielectric substrate.

In an embodiment, the first sheet 102 is a Reconfigurable Intelligent Surface (RIS). The RIS is a reconfigurable sheet of electromagnetic material that intentionally control the propagation environment to enhance the signal quality at the receiver. RIS is typically made of one or more low-cost and passive elements that are capable of modifying the electromagnetic waves impinging upon them in different directions.

Figure 1A:
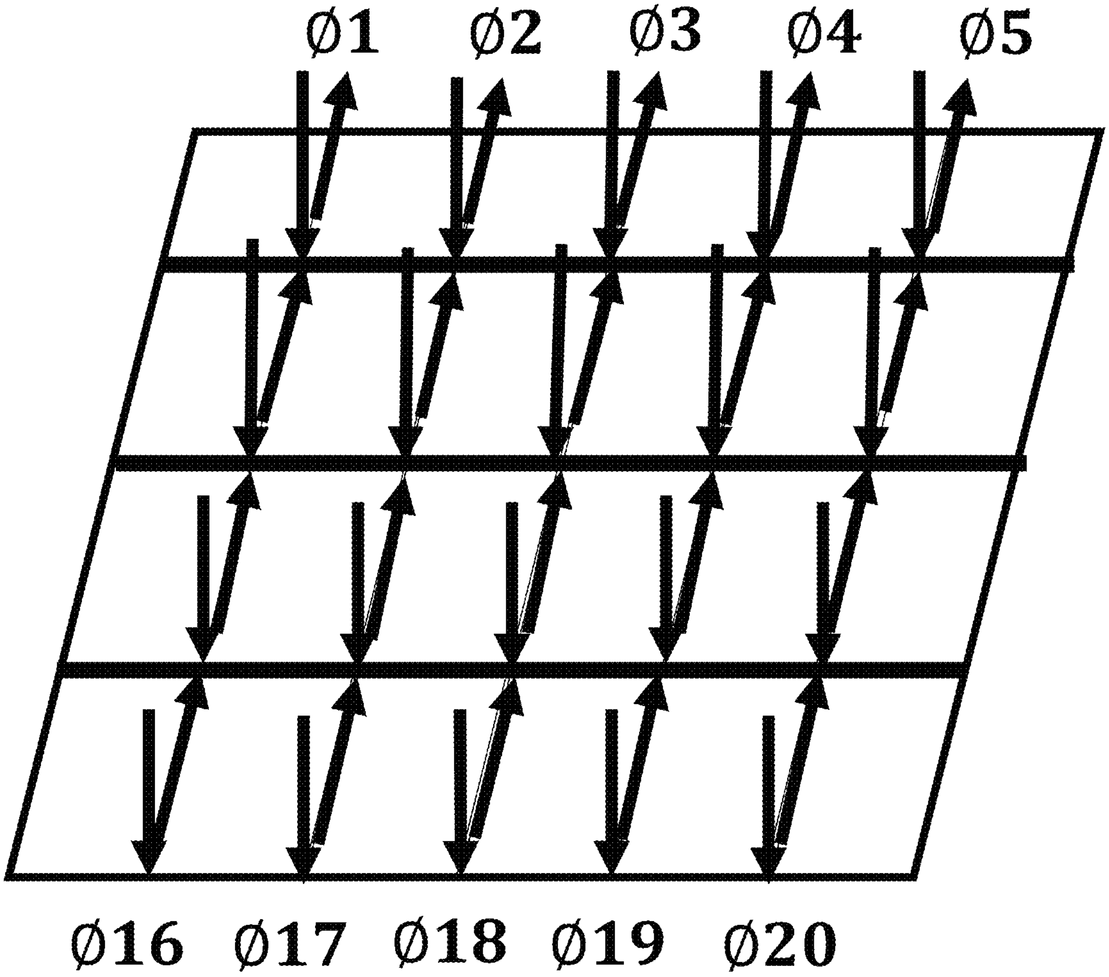
FIG. 1*a* illustrates an example RIS made of 20 reconfigurable elements according to an embodiment of the invention.

FIG. **1*a* illustrates an example RIS made of 20 reconfigurable elements whose phases (Φ), e.g. Φ1, Φ2, etc., may be tuned independently. The incident signals in the form of EM waves are reflected with a reflection angle. Although multiple incident signals are depicted in FIG. 1*a***, in practice, it may be that a single signal is incident on the RIS.

In an embodiment the RIS consists of one or more programmable reflecting elements. The RIS may also be referred to as a Software-Defined Surface (SDS), owing to that the response of the reflected EM signal may be programmed in software.

An advantage of using the first sheet 102 comprising the one or more elements **102*a* in the device 101** is that it requires much less power and processing requirements, e.g. encoding and decoding algorithms, compared to existing relaying and Multiple-Input Multiple-Output (MIMO) beamforming techniques.

Another advantage of the first sheet 102 comprising the one or more elements **102*a* in the device 101 is that it converts non-line of sight signals into a virtual line of sight signal thereby increasing the signal to interference ratio and thus, the data throughput of the communication between the BS 100 and at least a UE 110**.

In an embodiment, the second sheet 103 containing copper is used to shield the first sheet 102 from the controller circuitry 104 so that additional current or energy is not leaked to the controller circuitry 104.

In an embodiment, the second sheet 103 containing copper comprises holes through which one or more copper cables pass through. Each copper cable connects an element 102*a* of the first with the controller circuitry 104.

The controller circuitry 104 controls the one or more elements 102*a* and thereby configure the first sheet 102. The controller circuitry may, for example, send voltage or current signals to the one or more elements 102*a*.

In an embodiment, the controller circuitry 104 biases the one or more elements 102*a*, thereby controlling the operation of the diode comprised in the at least one element 102*a*. The controller circuitry, may for example, use the energy stored in the energy storage unit 105, to bias the at least one element 102*a*.

In an embodiment, the second sheet 103 contains at least copper. In such an embodiment, the second sheet 103 contains some other metal elements such as aluminum, zinc, nickel, iron, platinum, gold and silver, along with copper. In this case, the one or more metal elements are combined with copper in different compositions to obtain the second sheet.

In some embodiments, the second sheet 103 contains copper in the form of an alloy such as brass or bronze. As an example, a typical composition of brass contains 66% copper and 34% zinc.

In an embodiment, the controller circuitry 104 comprises a memory 106, a processor 107, a power divider unit 109 and an energy storage unit 105. The controller circuitry is responsible for adjusting or controlling the reflection amplitude and/or phase shift of each element 102*a* of the first sheet 102. The controller circuitry 104 comprises an interface to communicate with the BS 100 via a wired link or a wireless link for exchanging information between the BS 100 and the device 101.

In an embodiment, the controller circuitry 104 is implemented as a Field Programmable Gate Array (FPGA). In an embodiment, the controller circuitry is implemented as a Printed Circuit Board (PCB). In another embodiment, the controller circuitry 104 is implemented using a microcontroller.

Figure 2:
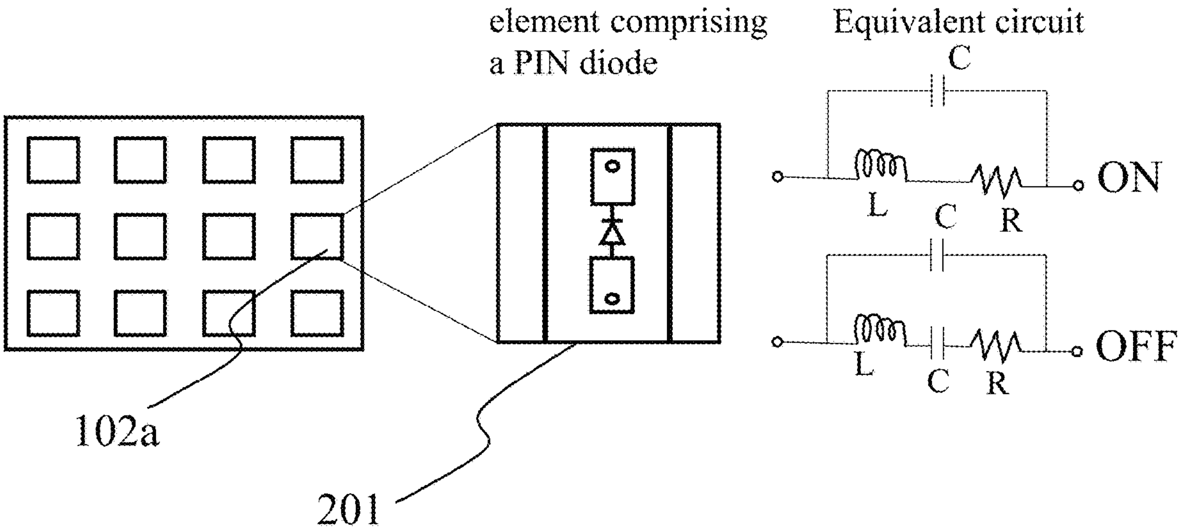
FIG. 2 illustrates a structure of the element 102*a* according to an embodiment of the invention.

In an embodiment the controller circuitry 104 controls each reflecting element 102*a* by sending to the diode, e.g. PIN diode 201 of FIG. 2, comprised in the element 102*a*, a current or a voltage signal comprising an amplitude value and phase value to reflect the incoming EM signal comprising a specific phase value and amplitude value.

In some embodiments, the power divider unit 109 is comprised in the first sheet 102, while in some other embodiments the power divider unit 109 is comprised in the controller circuitry 104.

In an embodiment, the energy storage unit 105 is comprised in the controller circuitry 104.

FIG. 2 illustrates a structure of the element 102*a* comprising a PIN diode 201 according to an embodiment of the invention. The PIN diode 201 is switched between the 'ON' and 'OFF' states by controlling the bias voltage. The bias voltage may be controlled via a Direct Current (DC) feeding line. This results in different phase shifts of the one or more elements. The phase shift, in radians, may, for example, be realized by setting the corresponding bias voltages by using the controller circuitry 104 of the device 101.

In an embodiment, the amplitude namely the reflection amplitude, is controlled by a variable resistor load applied in the element 102*a*. In other words, by changing the values of one or more resistors in each element 102*a*, a controllable reflection amplitude is achieved. As a result, different dissipation of incident signal's energy is achieved.

Hereby is achieved an independent control of the amplitude and the phase shift of the signal reflected from each element 102*a*.

In an embodiment, the incident signal interacting with the at least one element 102*a* may be mathematically represented as:

$$y_n = \beta_n e^{j\theta_n} x_n \quad n = 1, \ldots, N$$

Wherein $x_n$ is the incident EM signal on the nth element 102*a*, $\gamma_n$ is the reflected EM signal from the nth element 102*a*, $\beta_n$ is the reflection amplitude ratio. $\beta_n$ has a value in range of 0 to 1 including 0 and 1 wherein $\beta_n$=0 implies the element 102*a* comprised in the first sheet 102 fully absorbs the incident signal and $\beta_n$=1 implies the element 102*a* comprised in the first sheet 102 fully reflects the incident signal. On is the phase shift in radians having a value in the interval 0 to 2 π.

An equivalent circuit consisting of an Inductor I, one or more Capacitors C and a resistor R is presented in FIG. 2 in two configurations. A first configuration is the equivalent circuit for when the connection is ON and a second configuration is the equivalent circuit for when the connection is OFF. In other words, the element 102*a* is conducting electric current for the first configuration acting as a closed switch whereas the element 102*a* stops conducting for the second configuration acting as an open switch.

Figure 3:
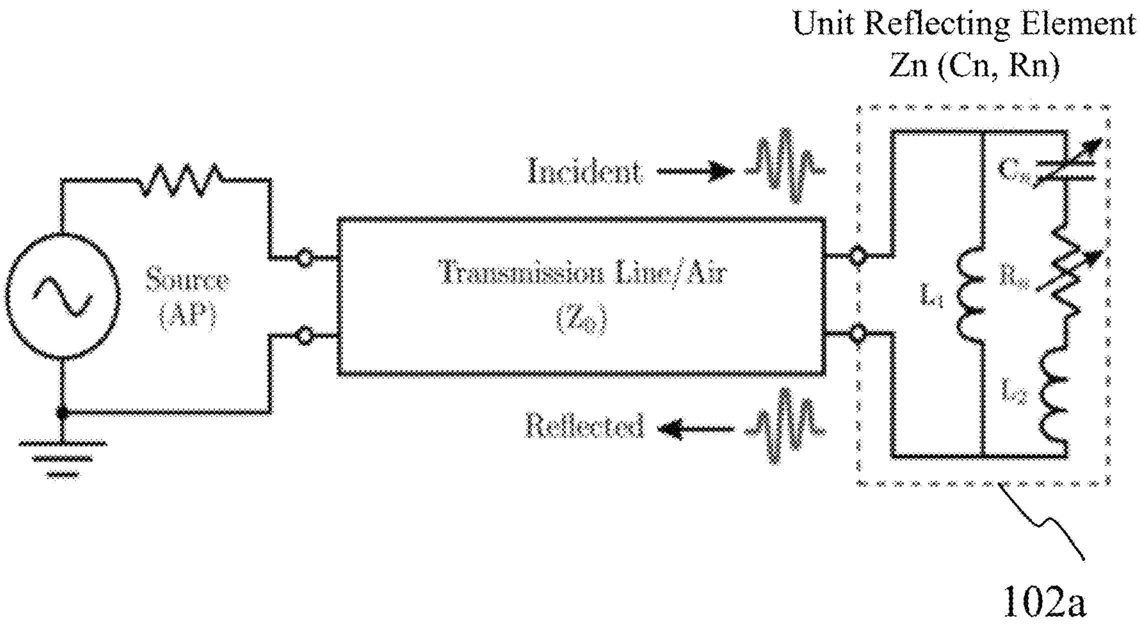
FIG. 3 illustrates a transmission line model for the element 102*a* according to an embodiment of the invention.

FIG. 3 illustrates a transmission line model for the element 102*a* according to an embodiment of the invention. In order to describe the functioning of the element 102*a*, as an example, S. Abey, R. Zhang, et. All "Intelligent Reflecting Surface: Practical Phase Shift Model and Beamforming Optimization" is referred to herein. The one or more reflecting elements 102*a* comprised in the RIS sheet 102 are equally spaced. In an embodiment, the unit reflecting element 102*a* is composed of a metal patch on the top layer of the PCB dielectric substrate and a full metal sheet on the bottom layer. Moreover, the controller circuitry 104, which can vary the impedance of the one or more elements 102*a* by, e.g. controlling its biasing voltage, is connected to the metal patch on the top layer so that the one or more elements 102*a* response can be dynamically tuned in real time without changing the geometrical parameters of the one or more elements 102*a*. In an embodiment, the conductance or resistance of the one or more elements 102*a* is controlled by varying the bias voltage to the one or more elements 102*a*. The source in FIG. 3 may refer to an access point generating the EM wave or to the BS 100.

In other words, when the geometrical parameters of the one or more elements 102*a* are fixed, the controller circuitry 104 controls the phase shift and amplitude for the reflecting signal. As the physical length of the one or more reflecting elements 102*a* is usually smaller than the wavelength of the incident EM signal, its response may, for example, be accurately described by an equivalent lumped circuit model as shown in FIG. 3 regardless of the particular geometry of the element 102*a*. As such, the metallic parts comprised in the one or more elements 102*a* can be modeled as inductors as the high-frequency current flowing on it produces a quasi-static magnetic field. In FIG. 3, the equivalent model for the n-th reflecting element is illustrated as a parallel resonant circuit and the impedance ($Z_n$) is given by $$Z_n(C_n, R_n) = \frac{j\omega L_1\left(j\omega L_2 + \frac{1}{j\omega C_n} + R_n\right)}{j\omega L_1\left(j\omega L_2 + \frac{1}{j\omega C_n} + R_n\right)}$$

where $L_1$, $L_2$, $C_n$, $R_n$, and ω denote the bottom layer inductance, top layer inductance, effective capacitance, effective resistance, and angular frequency of the incident signal, respectively. Note that $R_n$ determines the amount of power dissipation due to the losses in the semiconductor devices, metals, and dielectrics, which cannot be zero in practice, and $C_n$ specifies the charge accumulation related to geometry of the element 102*a* and the controller circuitry 104.

As the transmission line diagram in FIG. 3 depicts, the Reflection Coefficient ($\nu_n$) is the parameter that describes the fraction of the reflected EM wave or EM signal due to the impedance discontinuity between the free space impedance ($Z_0$) and the element impedance ($Z_n(C_n, R_n)$), which is given by $$\nu_n = \frac{Z_n(C_n, R_n) - Z_0}{Z_n(C_n, R_n) + Z_0}$$

$\nu_n$ is a function of $C_n$ and $R_n$. The reflected EM wave can be modified or changed in a controllable and programmable manner by varying the one or more $C_n$ and $R_n$ values. An example is provided below illustrating the behaviour of the amplitude and the phase shift, i.e., $|\nu_n|$ and $\arg(\nu_n)$, respectively, for different values of $C_n$ and $R_n$. Experimentally, as $C_n$ is varied from 0.47 pF to 2.35 pF when L1=2.5 nH, L2=0.7 nH, Z0=377Ω, and ω=2 π×2.4×109, it is observed that a reflecting element is capable of achieving almost 2 π full phase tuning, while the phase shift and the amplitude both vary with $C_n$ and $R_n$ in general. It is also observed that the minimum amplitude occurs near zero phase shift and approaches unity (the maximum) at the phase shift of π or −π, which is explained as follows. When the phase shift is around π or −π, the reflective current, also termed as image currents, are out-of-phase with the element current. The element current may refer to current generated when the EM signal is incident on the one or more elements 102*a* while the reflective current may refer to the current reflected, for example, due to discontinuity in characteristic impedance of the transmission line according to FIG. 3. Thus, the electric field and the current flow in the one or more elements 102*a* are both diminished, thus resulting in minimum energy loss and highest reflection amplitude of e.g. reflected EM wave. In contrast, when the phase shift is around zero, the reflective currents are in-phase with the element currents, and thus the electric field and the current flow in the one or more elements 102*a* are both enhanced. As a result, the dielectric loss, metallic loss, and ohmic loss increase dramatically, leading to substantial energy dissipation and thus lowest reflection amplitude of e.g. reflected EM wave. Further details on converting digital signals to phase shifted and amplitude scaled signals is found in S. Hum, et. al. "Reconfigurable Reflect arrays and Array Lenses for Dynamic Antenna Beam Control: A Review".

Figure 4A:
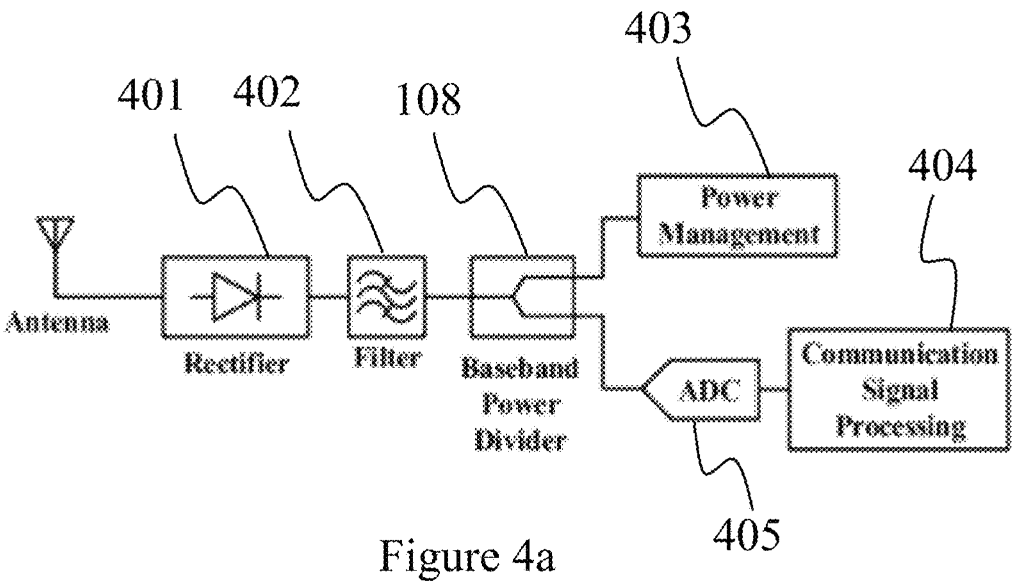
FIG. 4*a* and FIG. 4*b* illustrate a circuit diagram according to an embodiment of the invention.
Figure 4B:
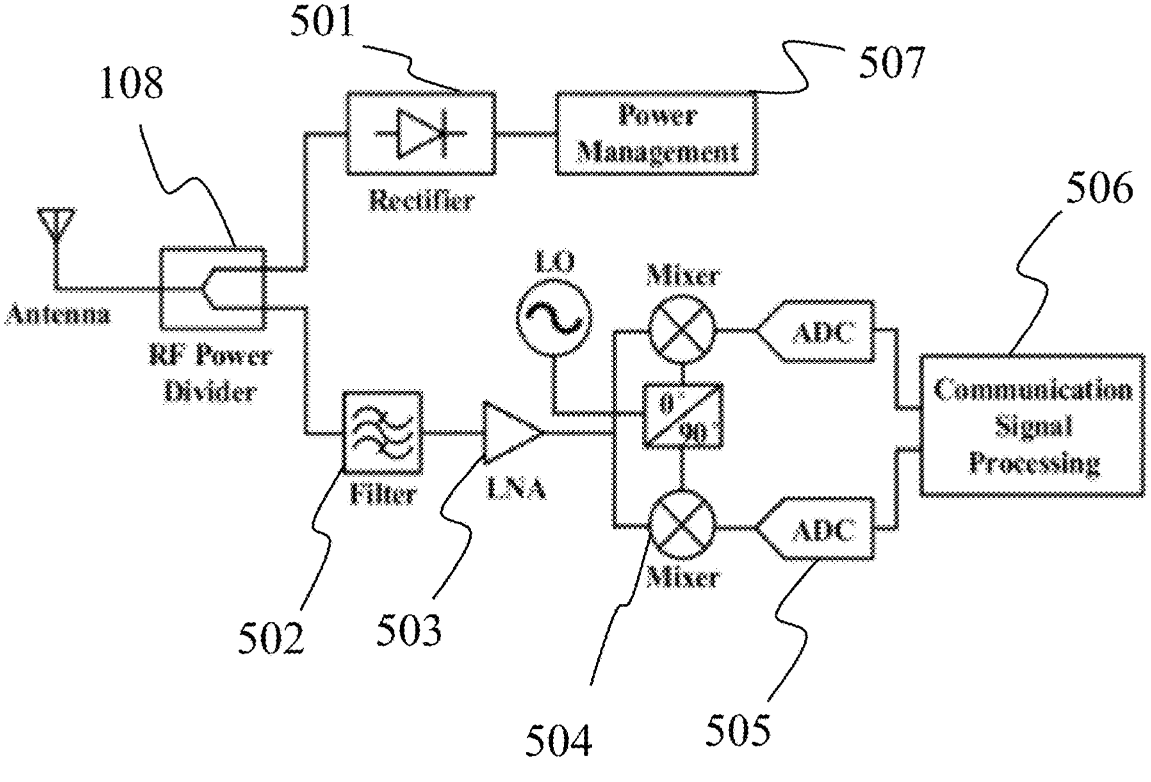

FIG. 4*a* and FIG. 4*b* illustrate a circuit diagram involving a power divider according to an embodiment of the invention.

More specifically, FIG. 4*a* and FIG. 4*b* illustrate a receiver architecture of a Simultaneous Wireless Information and Power Transfer (SWIPT) receiver for use in an embodiment of the invention. FIG. 4*a* illustrates a SWIPT-receiver-a receiver and FIG. 4*b* illustrates a SWIPT-receiver-b receiver.

The integration of SWIPT with various wireless technologies and the general principles of a power divider may be well understood by a person skilled in the art. The SWIPT schemes may be categorized as Power Splitting (PS) and Time Switching (TS). Using RF signal as an example of the EM signal, the incoming RF signal at the PS receiver is divided by the power divider unit 109, e.g. the RF power divider of FIG. 4*a* or 4*b*. The outputs of the power divider unit 109 are fed into an information decoder, e.g. the communication unit 112 and an energy harvester such as the energy storage unit 105.

In an embodiment where the TS scheme is deployed, the TS scheme switches between the power and data transmission modes over time. It may be noted that the PS scheme has a better tradeoff between the data rate and harvested power or energy than the TS scheme. SWIPT receiver-a typically requires lesser number of active component than the SWIPT receiver-b. However, both receivers require the power divider unit 109 in the form of the RF power divider, which is an essential component in the SWIPT receiver.

In some embodiments, the power divider unit 109 may, in addition to an RF power divider, comprise at least one of the components: a rectifier, a filter, an Analog to Digital Converter (ADC), a Low Noise Amplifier (LNA), a mixer e.g. a frequency mixer, and a Local Oscillator (LO).

In some embodiments, the power divider unit 109 is implemented as the SWIPT-receiver-a receiver. In some embodiments, the power divider unit 109 is implemented as the SWIPT-receiver-b receiver. In such embodiments, there may be present additional components in the form of the first sheet 102 and/or the second sheet 103 at which the incoming EM signal, e.g. RF signal, is received, prior to being received at the power divider unit 109. The antenna as illustrated in the SWIPT receivers of FIG. 4*a* and FIG. 4*b*, may, for example, be implemented in the first sheet 102. In an embodiment, the one or more elements 102*a* comprise the receiving antenna of the SWIPT receivers of FIG. 4*a* and FIG. 4*b*.

In an embodiment, the power divider unit 109 comprises the baseband power divider 108 of FIG. 4*a* or FIG. 4*b*.

The rectifier 401, 501 is responsible to convert radio frequency energy to direct current (DC). The filter 402, 502 is responsible to remove noise in the signal. The power management 403, 507, e.g. energy storage unit 105, is responsible to store energy. The ADC 405, 505 is responsible to convert analog signal to digital signals. The communication signal processing 404, 506 is responsible for performing baseband communication processing, such as modulation/demodulation encoding/decoding, Physical (PHY), Medium Access Control (MAC), or Radio Link Control (RLC) processing. The Low Noise Amplifier (LNA) 503 is an electronic amplifier that amplifies a very low-power signal without significantly degrading its signal-to-noise ratio. The mixer 504 is responsible to mix, convolve or multiply two frequencies typically to up-sample or down-sample signal frequencies.

In an embodiment according to FIG. 4*a*, the incoming EM signal is first incident on the first sheet, after which the absorbed, also referred to as transmitted, signal is passed through the rectifier 401 and the filter 402. The baseband power divider 108 then divides the EM signal into a signal that is fed to the power management 403 wherein the energy or power associated with the signal is stored in the energy storage unit 105. The incoming EM signal is preprocessed and then fed to the baseband power divider 108.

In an embodiment, the EM signal is divided into a signal that is fed to the communication signal processing (CSP) 404 via the ADC 405. The CSP 404 performs the function of decoding the data comprised in the EM signal.

In an embodiment according to FIG. 4*b*, the incoming EM signal is first incident on the first sheet, after which the absorbed, also referred to as transmitted, signal is passed to the baseband power divider 108. The baseband power divider 108 then divides the EM signal into a signal that is fed to the rectifier 501 and then to the power management 507, e.g. energy storage unit 105, wherein the energy or power associated with the divided EM signal is stored. In other words, the active components are implemented after the baseband power divider 108.

In an embodiment, the EM signal is divided into a signal that is fed to the communication signal processing (CSP) 404 via the filter 502, the LNA 503, the mixer 504, the ADC 505. The CSP 404 performs the function of decoding the data comprised in the EM signal.

Herein, is the advantage that the power divider unit 109 enables the device 101 to determine signal characteristics of the signal transmitted by the BS 100 and further assist the device 101 to have an optimal configuration of the device 101 for enabling communication between the BS 100 and the UE 110.

Figure 5:
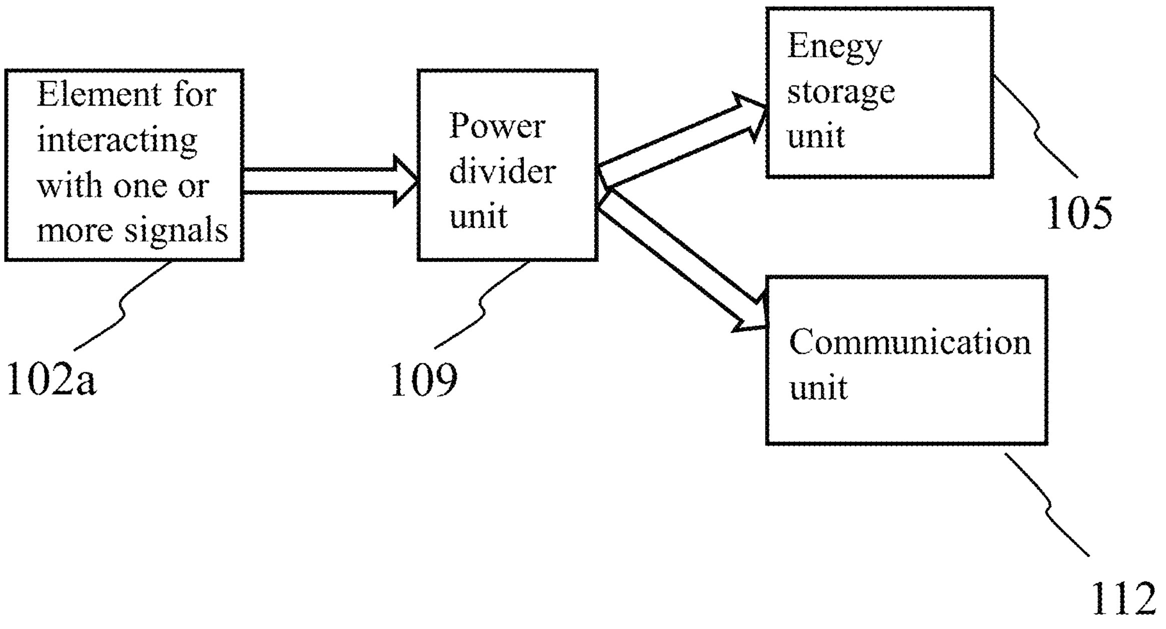
FIG. 5 illustrates one or more components of the system according to an embodiment of the invention.

FIG. 5 illustrates one or more components of the system according to an embodiment of the invention. FIG. 5 mainly illustrates the interaction or a flow diagram of one or more components such as one or more elements 102*a* for interacting with at least a signal, e.g. an EM signal, the power divider unit 109, the energy storage unit 105, and the communication unit 112.

In an embodiment, the reflection functionality, energy storing or harvesting functionality, and the communication functionality are achieved in a system of the invention. The power divider unit 109 comprising a power divider, e.g. an RF power divider, splits the received incident signal, e.g. an EM signal or an RF signal, into an EM signal passed to the energy storage unit 105 and another EM signal reflected to the one or more UEs 109. In an embodiment, the power divider unit 109 is comprised in the first sheet 102.

In an embodiment, a dielectric diode, e.g. the PIN diode 201 of FIG. 2, comprised in the element 102*a* is biased to obtain different reflection amplitude and phase values for the reflected EM signal.

The incident EM signal is first received at the one or more elements 102*a* according to one or more techniques described above. In a further embodiment, the device 101 comprises the communication unit 112 for communicating with the BS 100. The communication unit 112, may establish a communication with the BS 100 and exchange messages, e.g. 5G or LTE messages, in a separate communication channel. Such a communication may include instructions from the BS 100 instructing the communication unit 112 to configure the device 101 according to a desired configuration. The communication unit may further send information about the device 101 to the BS 112.

Further, the communication unit 112 may perform signal processing and decoding functions on the data comprised in the EM signal received at the one or more elements 102*a*.

In an embodiment, the one or more ß values of the one or more elements 102*a* are modified to obtain varying currents generated due to the incident EM signal. The current is further passed to at least one of the energy storage unit 105 and the communication unit 112.

In an embodiment, the energy storage unit 105 is directly attached to one or more reflective elements 102*a*. In this case, the energy is stored in a capacitor or a battery attached to the one or more elements 102.

One or more of the following advantages are achieved by enabling the storing of a portion of the power generated due to the incident EM signal:

- Operating one or more units of the device 110. In other words, the stored energy may be used for self-powering different components of the device.

Figure 6:
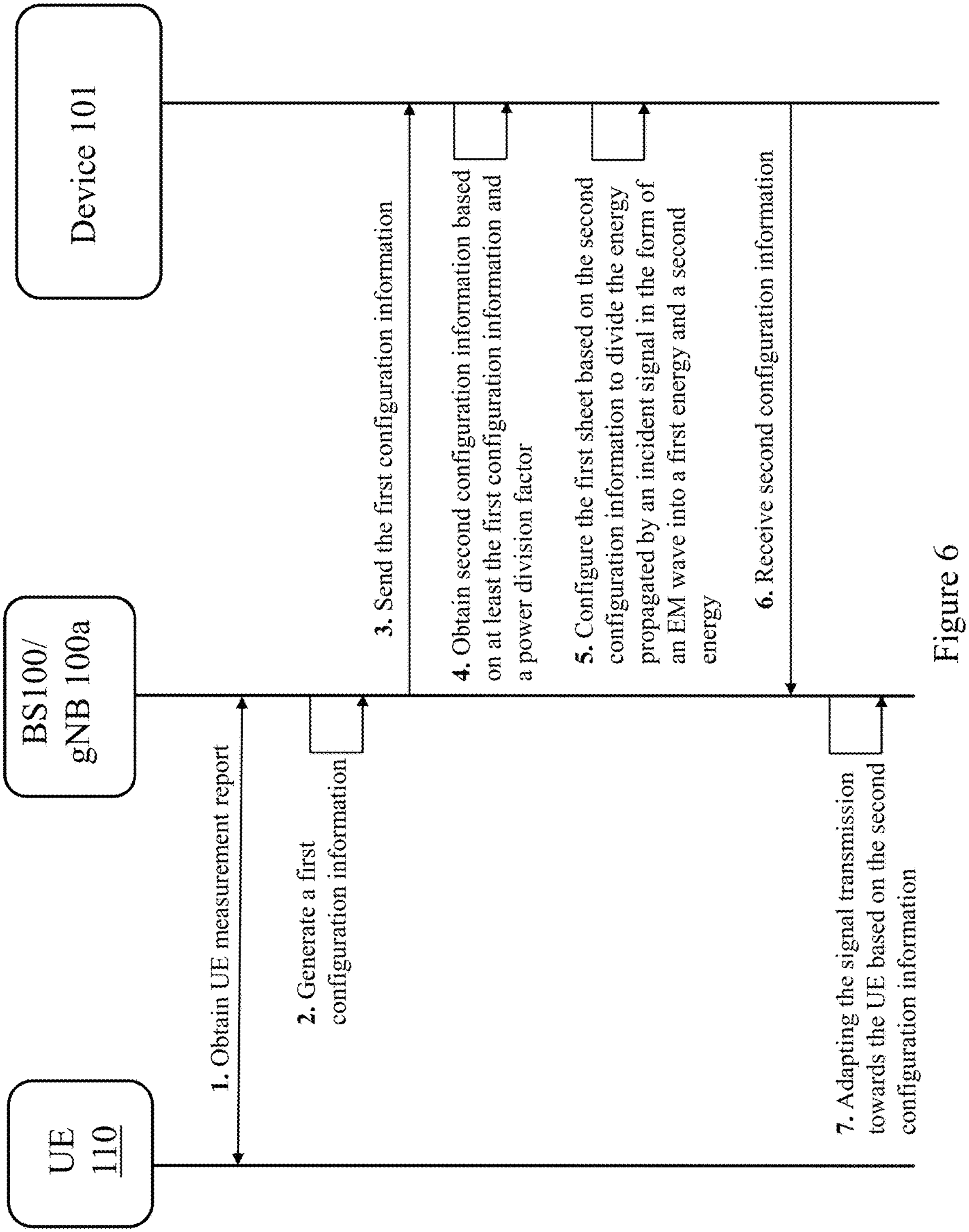
FIG. 6 illustrates lustrates the signal flow diagram for communication according to an embodiment of the invention.

FIG. 6 illustrates the signal flow diagram for the communication procedure between the UE 110, the BS 100 or the gNB 100*a* and the device 101 according to an embodiment of the invention.

Step 1: The BS 100, e.g. the gNB 100*a*, requests at least a measurement information from one or more UEs 110 operating in the communication system. The measurement information may be a measurement information such as the UE measurement report. The measurement information or the UE measurement report may, for example, comprise at least one of the following:

- Transmission (Tx) power and Receiving (Rx) Power of at least a UE 110—These parameters at least impact the interference and throughput of the communication between the UE and the BS 100.
- Interference levels, either at the BS 100 or at the one or more UEs 110. An example is the Received Signal Radio Quality (RSRQ) that impacts the throughput of the one or more UEs 110.
- Location of at least a UE 110 and the BS 100.
- UE Identifier (ID) and BS ID.
- Target Quality of Service (QOS) requirement
- BS antenna number and polarization—This parameter enables in deciding the reflection and energy absorbing ratio for improving the throughput of communication between the UE 110 and the BS 100 and for harvesting energy.
- At least a UE 110 antenna numbers and polarizations—This parameter enables in deciding the reflection and energy absorbing ratio for improving the throughput of communication between the UE 110 and the BS 100 and for harvesting energy.

The BS 100 may request for the measurement information or the UE measurement report in a request message. The UE may then send a response message comprising the measurement information. The message may, for example, be an RRCReconfiguration message or an RRCResume message.

An example message format including the measurement information or the UE measurement report is provided below in Table 1.

TABLE 1

Example message format including measurement information

| | | |
|---|---|---|
| MeasConfig ::= | SEQUENCE { | |
| measObjectToRemoveList | MeasObjectToRemoveList | OPTIONAL, -- Need N |
| measObjectToAddModList | MeasObjectToAddModList | OPTIONAL, -- Need N |

TABLE 1-continued

| Example message format including measurement information | | |
|---|---|---|
| reportConfigToRemoveList | ReportConfigToRemoveList | OPTIONAL, -- Need N |
| reportConfigToAddModList | ReportConfigToAddModList | OPTIONAL, -- Need N |
| measIdToRemoveList | MeasIdToRemoveList | OPTIONAL, -- Need N |
| measIdToAddModList | MeasIdToAddModList | OPTIONAL, -- Need N |
| s-MeasureConfig | CHOICE { | |
| ssb-RSRP | RSRP-Range, | |
| csi-RSRP | RSRP-Range | |
| Interference | Int-Range | |
| Target-QoS | Target-QoS | |
| UEPol | uEPol | |
| } | | OPTIONAL, -- Need M |
| quantityConfig | QuantityConfig | OPTIONAL, -- Need M |
| measGapConfig | MeasGapConfig | OPTIONAL, -- Need M |
| measGapSharingConfig | MeasGapSharingConfig | OPTIONAL, -- Need M |
| ..., | | |
| [[ | | |
| interFrequencyConfig-NoGap-r16 | ENUMERATED{true} | OPTIONAL -- Need R |
| ]] | | |
| } | | |
| ReflectiveSurface__ParamConfig ::= | SEQUENCE { | |
| Scatter__Ratio | ratio | |
| Amplitude__Ref__signal | AmpRef | |
| Phase__Ref__signal | PhaseRef | |
| Ratio__Power__divider | RatioPowDivid | |
| } | | |
| MeasObjectToRemoveList ::= | SEQUENCE (SIZE (1..maxNrofObjectId)) OF MeasObjectId | |
| MeasIdToRemoveList ::= | SEQUENCE (SIZE (1..maxNrofMeasId)) OF MeasId | |
| ReportConfigToRemoveList ::= | SEQUENCE (SIZE (1..maxReportConfigId)) OF ReportConfigId | |
| -- TAG-MEASCONFIG-STOP | | |

The BS 100 may further include one of the following as the measurement information based on certain pre-configuration information:

- predicted period or time of traffic between the BS 100 and the UE 100
- Scatter ratios of one or more elements 102*a* of the device 101—This parameter helps in deciding the reflection ratio to improve throughput.

In an embodiment, the BS 100 sends to the device 101, a request message comprising a request for the scatter ratios of one or more elements 102*a*. The device 101 responds by sending to the BS 100, a response message comprising the scatter ratios of one or more elements 102*a*.

In an embodiment, the scatter ratio is the reflection ratio of the incident signal to the reflected signal of the element 102*a*.

Step 2: The BS 100 generates a first configuration information by combining the measurement information received from the one or more UEs 110 with the pre-configuration information of Step 1. The pre-configuration information may relate to the device 101 and/or interaction between the BS 100 and one or more UEs 100. The first configuration information is meant for use by the device 101. In an embodiment, the first configuration information is generated in order to enable configure the device 101 with the first configuration information.

The first configuration information is provided to the device 101 in order to enable the device to have an optimized configuration for reflecting the incident EM signals from the BS 100 to the one or more UEs 110. Hereby is achieved, an improved communication between the BS 100 and the one or more UEs 110 via the device 101. The improvement may, for example, be obtained in the data throughput, signal quality at the one or more UEs 110, and/or UE power consumption.

Step 3: The BS 100 sends to the device 101 a message comprising the first configuration information. In an embodiment, the BS 100 sends to the communication unit 112, a message comprising the first configuration information. The message may, for example, be an RRCReconfiguration message or an RRCResume message.

Step 4: The device 101 obtains a second configuration information based on at least the first configuration information and a first power division factor. The second configuration information may, for example, be used to configure the device 101 in order to improve the communication between the BS 100 and the one or more UEs 110, such as improvement in data throughput or signal quality at the one or more UEs 110. The first power division factor may, for example, be used to determine the portion of energy of the incident EM signal to be reflected and the portion of energy of the incident EM signal to be absorbed. It may be noted that there would additionally exist a negligible portion of the energy of the incident EM signal that is lost, e.g. as heat dissipation.

The power division factor may be controllable by the controller circuitry 104. In other words, the controller circuitry 104 may control the power division factor based on the communication environment and/or according to the instruction from the BS 100.

In an embodiment, the first power division factor is the value β. In such embodiments, the value β lies in interval 0 to 1, including 0 and 1.

In some embodiments, the first power division factor is a ratio of the energy of the incident EM signal to be reflected and the energy of the incident EM signal to be absorbed. As an example, the first power division factor is $$\frac{40}{60}$$

indicating 40% of the energy of incident EM signal to be reflected and 60% energy of incident EM signal to be absorbed.

In some other embodiment, the first power division factor is a value of the portion of the incident signal to be reflected. For example, to achieve 40% reflection of the energy of the incident EM signal, the first power division factor is a value 0.4.

In some other embodiment, the first power division factor is a value of the portion of the incident signal to be absorbed. For example, to achieve 60% reflection of the energy of the incident EM signal, the first power division factor is a value 0.6.

In an embodiment, the first power division factor is pre-configured in the device 101.

In an embodiment, the first power division factor is received in a message from the BS 100. The message may, for example, be the message comprising the first configuration information, wherein the message further comprises the first power division factor.

The power division factor, e.g. the first power division factor and/or the second power division factor, enables the device 101 to operate in different operating modes based on the requirement of the communication environment involving the BS 100 and the one or more UEs 110. Based on the power division factor, the device 101 may be configured to operate as energy storage device in scenarios where the communication environment is of good communication quality.

In some other scenario where the communication quality between the BS 100 and the one or more UEs 110 is poor due to an obstruction, e.g. obstruction 111, the device 101 may be configured based on a power division factor such that a high reflection amplitude or a high energy of reflection is achieved, thereby the device 101 facilitating improved communication between the BS 100 and the one or more UEs 110. This may further be seen as improving the Non-Line of Sight (NLOS) communication between the BS 100 and the one or more UEs 110

The second configuration information may, for example, be at least one of the following information:

- amplitude of the reflected signal per element 102*a* of the first sheet 102;
- phase shift of the reflected signal per element 102*a* of the first sheet 102;
- second power division factor.

In an embodiment, the second power division factor is an optimized value of the first power division factor, optimized and adapted according to the communication environment between the BS 100 and the one or more UEs 110.

In an embodiment, the second configuration information is obtained by using a Machine Learning, ML, model. The input for the ML model may, for example be at least the first configuration information and the first power division factor. The output of the ML model is the second configuration information.

While it may be noted that the general principles of ML is well known to a person skilled in the art, a brief explanation of the functioning of the ML model is provided herein.

The ML model contains a dataset consisting of the data of the first configuration information as the input and the data of the second configuration information as the output. Labels are obtained for the output data. The labels may, for example, be obtained as supervised labels or via a manual labelling procedure. The label may, for example, be obtained via the convex optimization process.

Once the labelled data is available, the training data is separated into batches and trained. This may include, performing the back propagation procedure in order to tune weights of, e.g. neural network. Further steps include, iterating over all the batches of the training data and then achieving convergence. The ML model may, thus, infer the optimized value of the output, i.e. the second configuration information.

In an embodiment, the ML model is executed in or on the device 101.

In an embodiment, the ML model is executed on the BS 100. In such an embodiment, the device 101 obtains the second configuration information from the BS 100 comprised in a message, wherein the second configuration information is the output of the ML model. In such an embodiment, the device 101 sends an acknowledgement message comprising an indication acknowledging that the device 101 is configured based on the second configuration information. The message may, for example, be an RRCReconfiguration message or an RRCResume message.

The ML model may, for example, be a Random Forrest, a neural network defined by the number of neurons, number of input layers, number of output layers or number of hidden layers.

In an embodiment, the ML model contains 50 layers, each with 100 neurons.

In an embodiment, the ML model contains a Relu activation function. The Relu is a rectified linear activation function.

In an embodiment, the ML model training is executed online. In an embodiment, the ML model training is executed offline.

In an embodiment, the second configuration information is obtained by using a Deep Reinforcement Learning (DRL) model.

An example describing the DRL algorithm is provided below.

The one or more of the following parameters may, for example, be obtained by conducting experiments, field trials of the UE 110 and the BS 100 and/or of the communication between the UE 110 and the BS 100. Definition of input and/or output parameters of the DRL model is as follows:

q: represents weights of the deep neural network for the derivation of the next state's Q-value.

$q^-$: represents weights from the previous iteration.

$TP_n$, $w_{n,TP}$: Throughput per UE 110, and the corresponding weight.

$RE_{m,T}$, $w_{m,RE}$: Radio energy per each element, and the corresponding weight.

$OH_T$, $w_{OH}$: Overhead bits generated due to exchanging information between the controller circuitry 104 and the BS 100, e.g. gNB 100*a* to one or more UEs 110, and the corresponding weight.

$SINR_n$, $w_{n,s}$: Signal-Interference Ratio (SINR) per UE 110, and the corresponding weight.

$P_{Tx,n}$: Transmission power per node $E_T$, $w_E$: Energy consumption per whole system, i.e. energy consumption per UE 110 plus energy consumption per BS 100, and the corresponding weight.

$P_{r,n}$, $w_{Pr,n}$: Physical Resource Block (PRB) allocation per UE 110, and the corresponding weight.

$T_{u,n}$, $w_{Tu,n}$: Traffic pattern per UE 110, and the corresponding weight. Refers to periodic or aperiodic arrival and/or transmission of the payload packets.

$R_{u,n}$, $w_{n,Rel}$: UE reliability and the corresponding weight. UE reliability refers to ratio of number of UEs satisfying specific packet error rate and specific latency to the total number of UEs.

$S_m$, $w_{m,s}$: System security parameter measured by leaked signal, and the corresponding weight.

Actions:

$A:=\{a_0, \ldots a_M\}, \forall\, a_m \in A$ represents the set of actions for each reflection element m, where $a_1 \in \{\theta_1, b, r_{1,r}\}$, where $\theta_1$ is the reflection phase for element 1, $b_1$ is the amplitude of reflected signal for element 1, $r_{1,r}$ is the ratio of reflection and energy harvesting, used in the power divider, e.g. in the power divider unit 109, to split the incident EM signal.

$$S = (OH_n, RE_m, TP_n, SINR_n, P_{Tx,n}, E_T, P_{r,n}, T_{u,n}, S_m)\ \forall\, s_n x s_m \in S$$

$$R = \sum_{n=1}^{N} w_{n,s} SINR_n(s_n, a_n) + \sum_{n=1}^{N} w_{n,OH} OH_n(s_n, a_n) + \sum_{m=1}^{M} w_{m,RE} RE_m(s_m, a_m) + \sum_{m=1}^{M} w_{m,S} S_m(s_m, a_m) - w_d E_T(s_n, a_n) + \sum_{n=1}^{N} w_{n,Rel} R(s_n, a_n) + \sum_{n=1}^{N} w_{n,TP} TP(s_n, a_n)$$

S refers to the set of state vectors and R is the reward. The aim is to maximize the value of R.

Algorithm:

One or more terms used to describe the algorithm as given below as an example:

In an embodiment, an environment refers to an object that the DRL agent is acting on, and the agent represents the DRL algorithm.

Action (A): All the possible moves that the DRL agent can take. The action may, for example, be obtaining and/or changing the phase and amplitude of the one or more elements 102_a_.

State(S): Current situation returned by the environment.

Reward (R): An immediate return from the environment to evaluate the last action.

Policy (x): The strategy that the agent employs to determine a next action based on the current state.

Value (V): The expected long-term return with discount, as opposed to the short-term reward R. $V\pi(s)$ is defined as the expected long-term return of the current state under policy $\pi$.

Q-value or action-value (Q): Q-value is similar to Value, except that it takes an extra parameter, the current action a. $Q\pi(s, a)$ refers to the long-term return of the current state s, taking action a under policy $\pi$.

1: Input: Action space A, mini-batch size $L_b$, weights of the rewards sub-functions, target network replacement
2: Output: Optimal policy $\pi^*$ for N local training nodes+global aggregation node, e.g. the BS 100.
3: Initialize replay memory D to capacity of N nodes
4: Initialize action-value function Q with random weights
5: Initialize target action-value function $Q\hat{}$ with weights $q^{-}=q$
6: for Episode=1 to E do
7: Initialize sequence $s^1$ and preprocessed sequence $\emptyset^1=\emptyset^1(s^1)$
8: for timestep=1 to T do
9: Choose an action $a_t$
10: With probability $\varepsilon$, a random action is performed
11: Otherwise, choose $a_t=\text{argmax}_a Q\ (\emptyset^1\_\ (s_t, a)$ from Q(s, A; q)
12: Broadcast messaging $a_t$ for NM nodes
13: Execute chosen action a
14: Receive reward R
15: Receive state messages, node
16: Update next network state s'
17: Store tuple (s, a, r, s') in replay memory D
18: Randomly sample tuple (ss, aa, rr, ss') of mini-batch size ($L_b$) from replay memory D
19: Calculate target Q-value for each mini-batch transition
20:

$$y_t^{DQN} = r$$

if episode terminates at timestep+1, else $$y_t^{DQN} = r + \gamma\ \max\nolimits'_a Q(\phi_{j+1}, a', q^{-})$$

21: Train the Q-Network using $$\left(y_t^{DQN} - Q(ss, aa)^2\right)$$

as loss and update the weights q
22: Reset $q^{-}=q$ every $L^{-}$steps
23: Update s←s'
24: Increment timestep by 1
repeat until timestep is >T, terminate
repeat until Episode is >E, terminate The above DRL algorithm example and/or the ML model, further enables an optimization of one or more Key Performance Indices, KPIs, of the communication between the BS 100 and the one or more UEs 110 via the device 101.

Step 5: Configure the first sheet 102 based on the second configuration information to divide the energy propagated by an incident signal in the form of an EM wave into a first energy and a second energy, wherein the first energy is propagated as a reflected signal in the form of another EM wave towards a UE and the second energy is stored. The first sheet comprises the one or elements 102_a_.

In an embodiment, the first sheet 102 is configured by the controller circuitry 104 that controls the operation of the one or more elements 102_a_. The controller circuitry may, for example, send voltage or current signals to the one or more elements 102_a_ in order to configure the first sheet 102.

In an embodiment, the first 102 is configured by the controller circuitry 104 by biasing the one or more elements 102_a_ comprised in the first sheet 102. The controller circuitry 104 may, for example, use the power or energy stored by the energy storage unit 105 to bias the one or more elements 102_a_.

In an embodiment, the first sheet 102 is configured based on the second configuration information prior to incidence of the EM signal.

In an embodiment, the incident signal in the form of an EM wave is an RF signal. In an embodiment, the reflected signal in the form of an EM wave is an RF signal.

In an embodiment, the one or more elements 102_a_ of the first sheet 102 propagate the first energy as reflecting EM signal towards one or more UEs.

In an embodiment, the device 101 is configured based on the second configuration information. For example, the one or more elements 102_a_ of the first sheet 102 is configured based on the second configuration information by changing the values of one or more resistors in each element 102_a_. In an embodiment, the one or more elements 102_a_ of the first sheet 102 is configured by setting the corresponding bias voltages to obtain different phase shifts.

In an embodiment, the controller circuitry 104 of the device 101 configures the one or more elements 102_a_ of the first sheet 102.

The device 101 may, for example, be configured based on the second configuration information obtained according to any of the techniques described above in relation to Steps 3 and 4.

The device 101 is configured based on the second configuration information to improve at least one of the following:

optimize reflection angle and amplitude of the reflected signal from the one or more elements 102_a_ to enhance at least one of throughput, reliability, latency, interference.

reduce leakage of targeted signal, e.g. reflected signal, thereby increasing security improve energy efficiency of one or more UEs, e.g. in mines, by improving signal transmission.

In an embodiment, the second energy is stored in the energy storage unit 105. The second energy may be stored according to any of the techniques described above in relation to one or more figures.

In an embodiment, the second energy that is stored is used to power the device 101. In some embodiments, the second energy that is stored is used to power one or more units of the device 101.

In an embodiment, the second energy is stored in the device 101.

In some other embodiments, the energy is stored in the BS 100. In such a case, the device 101 may be connected to the BS 100 via conducting cables to carry the current that is to be stored in the BS 100. In a further embodiment, the conducting cables are made of copper.

In an embodiment, an energy threshold value is configured in the device 101 to enable the device 101 to determine an amount of stored energy that is used to power the device 101. In an embodiment the energy threshold value is pre-configured in the controller circuitry 104. In a further embodiment, the controller circuitry configures the device 101 to distribute the stored energy using the energy threshold value. In some other embodiments, the BS 100 sends to the device 101, the energy threshold value. In an embodiment, the BS 100 sends the energy threshold value in the message comprising the first configuration information.

Hereby is an advantage, that the energy threshold value enables a distribution of stored energy for a specific purpose, e.g. powering the device. Further is enabled energy harvesting capability in the communication system via the pre-configuration of energy threshold value in the device 101 or by sending the energy threshold value in a message to the device.

Step 6: The device 101 sends to the BS 100, a message comprising the second configuration information. In an embodiment, the communication unit 112 of the device 102 sends to the BS 100, the message comprising the second configuration information.

The message may, for example, be an RRCReconfiguration message or an RRCResume message. The device 101 and the BS 100 may exchange such messages at different periodicity such as every 0.7 micro second (sec), every 0.5 msec, every 1 msec, every 40 msec, every 100 msec, every 1 sec, every 1 hour, or every day.

The device 101 may send the second configuration information to the BS 100 after configuring the one or more elements 102_a_ of the device 101 based on the second configuration information.

By this is achieved an effect that the BS 100 is dynamically updated about the new configuration of the device 101 based on the latest communication environment KPIs.

Step 7: The BS 100 adapts the signal transmission of the BS 100 towards the one or more UEs 110 based on the second configuration information received from the device 101.

In an embodiment, the BS 100 uses a ML model to predict and/or obtain the one or more KPIs of the communication between the BS 100 and the one or more UEs 110. In such an embodiment, the BS 100 uses the second configuration information as input to the ML model. The KPIs may, for example, be at least one of data throughput, reliability, latency, interference, quality.

The BS may further adapt the Tx power and Rx Power of the BS, the BS polarization, tilt of the antennae and other radio parameters to improve the communication with the one or more UE. This may further lead to energy efficient communication.

Hereby is achieved a mechanism for making use of the device 101 in the communication system 001 to dynamically adapt the signal transmission between the BS 100 and the one or more UEs based on the configuration information of the device. This enables in achieving better throughput, higher reliability, lesser interference, energy efficiency and increased signal quality.

Figure 7:
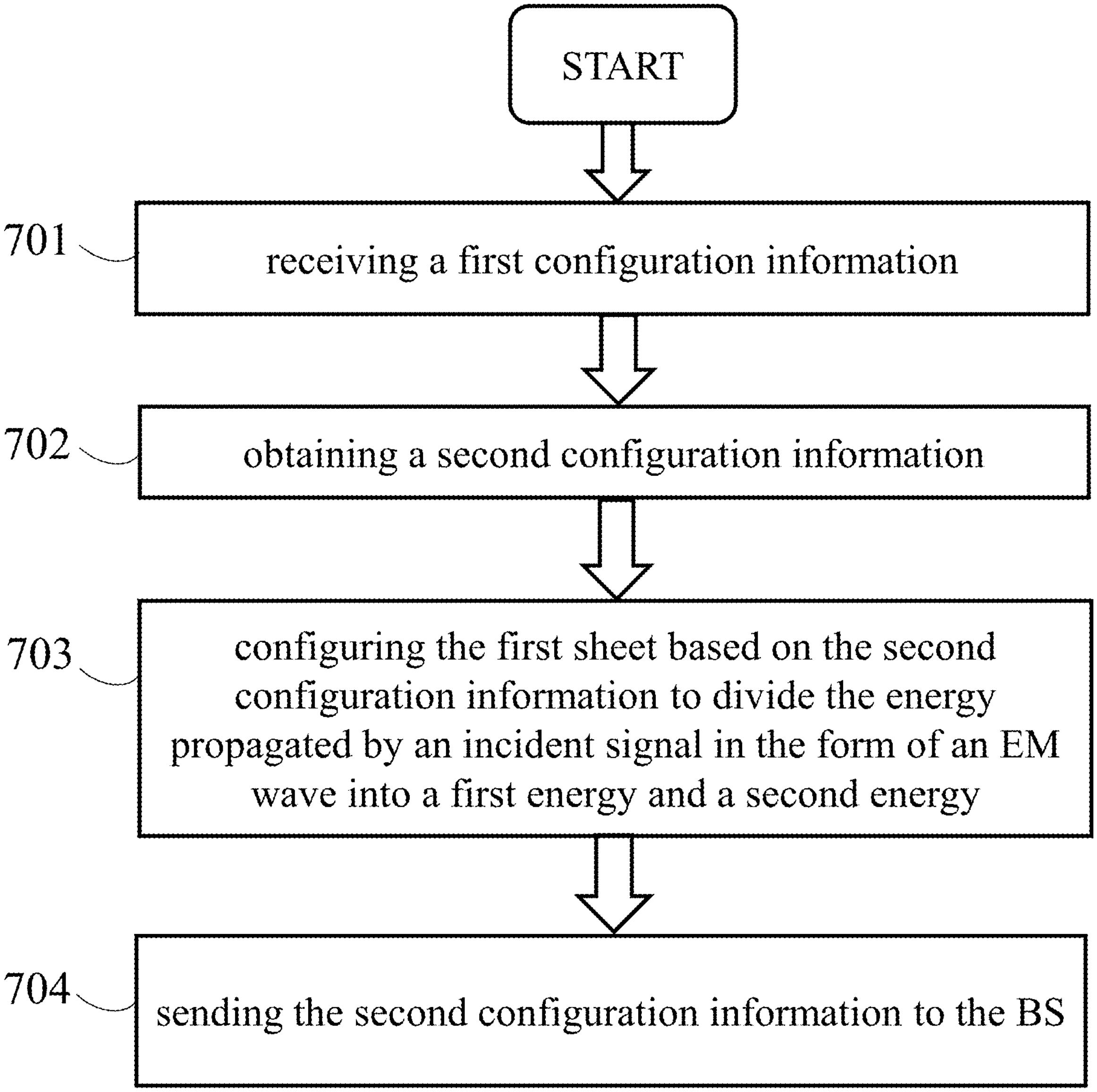
FIG. 7 illustrates a method performed by the device 101 according to an embodiment of the invention.

FIG. 7 illustrates a method performed by the device 101 for enabling a communication between a base station 100 and a UE 110 according to an embodiment of the invention. The method comprises:

receiving 701 from a Base station, BS, a first message comprising a first configuration information for the device;

obtaining 702 a second configuration information for the device based on at least the first configuration information and a first power division factor ( )

configuring 703 the first sheet based on the second configuration information to divide the energy propagated by an incident signal in the form of an EM wave into a first energy and a second energy, wherein the first energy is propagated as a reflected signal in the form of another EM wave towards a UE and the second energy is stored; and sending 704, to the BS, the second configuration information.

Figure 8:
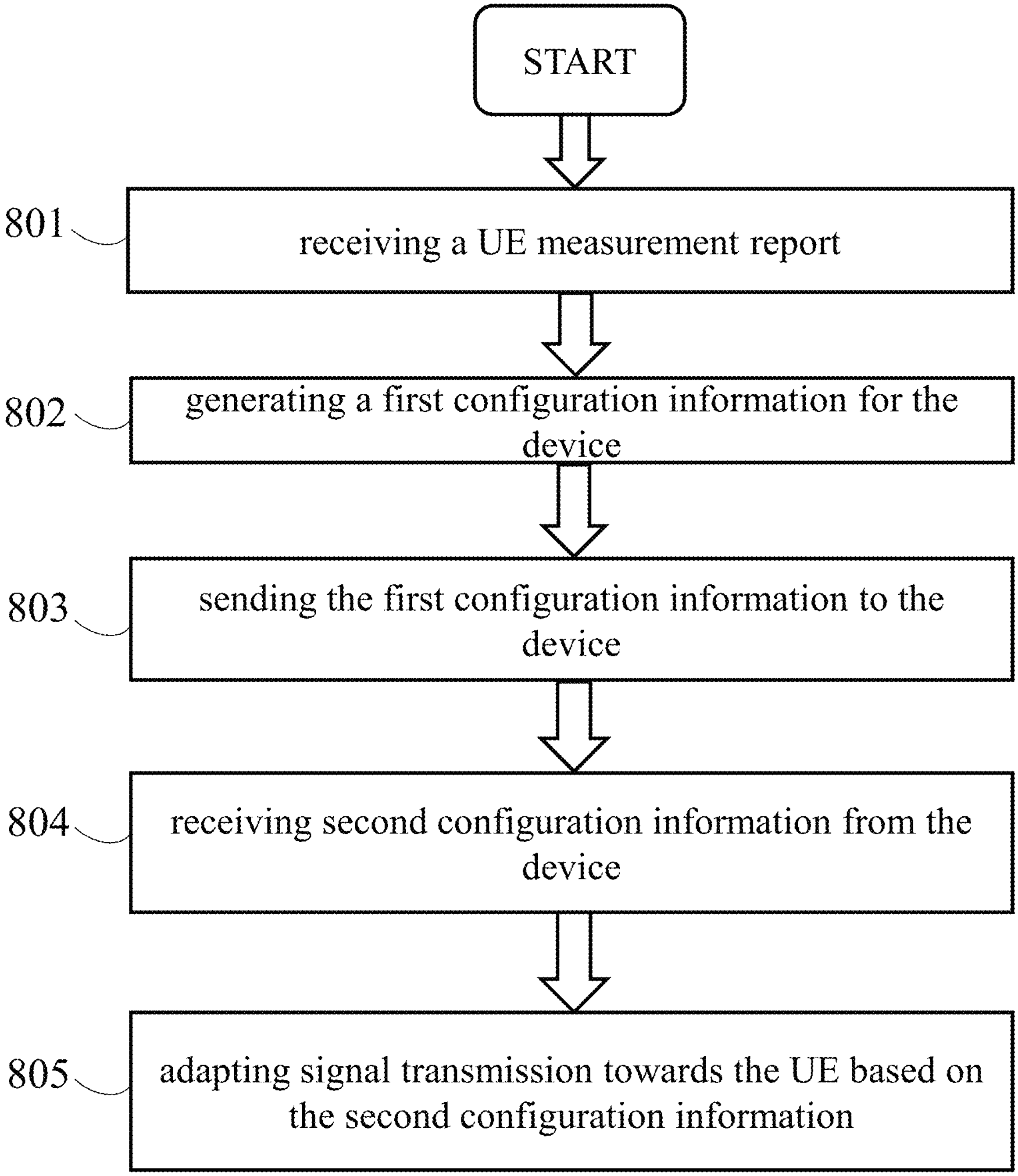
FIG. 8 illustrates a method performed by the BS 100 according to an embodiment of the invention.

FIG. 8 illustrates a method performed by the BS 100 according to an embodiment of the invention. The method comprises:

receiving 801 from a UE 110, a UE measurement report;

generating 802 a first configuration information for a device based on at least the UE measurement report;

sending 803 to the device, a first message comprising the first configuration information;

receiving 804 from the device, a second message comprising a second configuration information based on which the device is configured; and adapting 805 the signal transmission of the BS towards the UE based on the second configuration information.

In general terms, each functional unit, i.e. the energy storage unit 105, the power divider unit 109, the communication unit 112 may be implemented in hardware or in software. Preferably, one or more or all functional units 105,109,112 may be implemented by the one or more processors 107, possibly in cooperation with the computer readable storage medium 902 or the memory 106. The one or more processors 107 may thus be arranged to fetch instructions, from the computer readable storage medium 902 or the memory 106, as provided by a functional units 105,109,112 and to execute these instructions, thereby performing any steps of the device 101 as disclosed herein.

Figure 9:
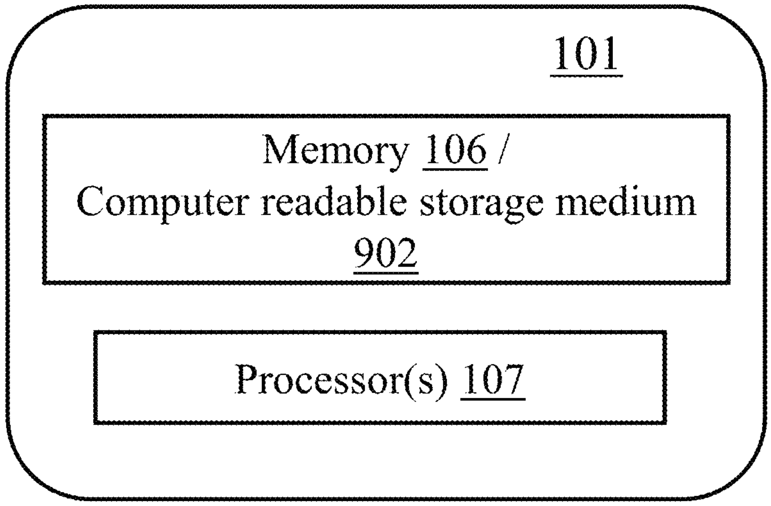
FIG. 9 illustrates the device 101 according to an embodiment of the invention.

The device 101 according to FIG. 9 may have storage and/or processing capabilities. The device 101 may be configured to control any of the methods and/or processes described herein and/or to cause such methods, and/or processes to be performed. Processor 107 corresponds to one or more processors 107 for performing the device 101 functions described herein. The device 101 includes memory 106 or computer readable storage medium 902 that is configured to store data, programmatic software code and/or other information described herein. In particular, in addition to a traditional processor and memory, the device 101 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor(s) 107 may be configured to access, e.g., write to and/or read from the memory 106 or the computer readable storage medium 902, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

The memory 106 or the computer readable storage medium 902 may include instructions which, when executed by the one or more processors 107, cause the device 101 perform the processes described herein with respect to the device 101, e.g. method(s) described in relation to FIG. 7. The instructions may be software (SW) or computer program associated with the device 101.

Thus, the device 101 may further comprise SW or computer program, which is stored in, for example, the memory 106 or the computer readable storage medium 902 at the device 101, or stored in external memory, e.g., database, accessible by the device 101. The SW or computer program may be executable by the one or more processors 107.

Figure 10:
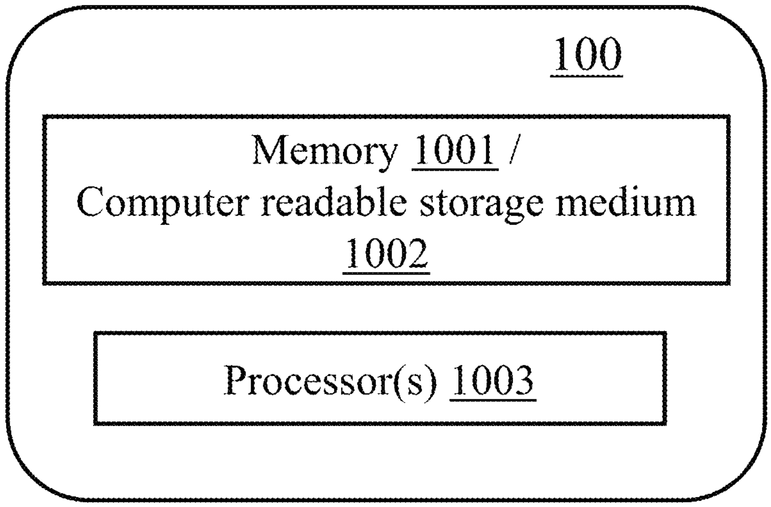
FIG. 10 illustrates the BS 100 according to an embodiment of the invention.

The BS 100 according to FIG. 10 may have storage and/or processing capabilities. The BS 100 may be configured to control any of the methods and/or processes described herein and/or to cause such methods, and/or processes to be performed. Processor 1003 corresponds to one or more processors 1003 for performing the BS 100 functions described herein. The BS 100 includes memory 1001 or computer readable storage medium 1002 that is configured to store data, programmatic software code and/or other information described herein. In particular, in addition to a traditional processor and memory, the BS 100 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor(s) 1003 may be configured to access, e.g., write to and/or read from the memory 1001 or the computer readable storage medium 1002, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

The memory 1001 or the computer readable storage medium 1002 may include instructions which, when executed by the one or more processors 107, cause the BS 100 to perform the processes described herein with respect to the BS 100, e.g. method(s) described in relation to FIG. 8. The instructions may be software (SW) or computer program associated with the BS 100.

Thus, the BS 100 may further comprise SW or computer program, which is stored in, for example, the memory 1001 or the computer readable storage medium 1002 at the BS 100, or stored in external memory, e.g., database, accessible by the BS 100. The SW or computer program may be executable by the one or more processors 1003.

A computer program product in the form of a computer readable storage medium 902, 1002 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media, for example, a flash drive, a Compact Disk (CD) or a Digital Video Disk (DVD), and/or any other volatile or non-volatile, non-transitory device readable and/or computer-executable memory devices that store information, data, and/or instructions that may be used by one or more processors 107, 1003. Computer readable storage medium 902, 1002 may store any suitable instructions, data or information, including a computer program, software, an application including one or more of logic, rules, code, tables, etc. and/or other instructions capable of being executed by one or more processors 903, 1003. Computer readable storage medium 902, 1002 may be used to store any calculations made by one or more processors 107, 1003. In some embodiments, one or more processors 107, 1003 and computer readable storage medium 902, 1002 may be considered to be integrated.

The term unit or the term functional unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Clearly, several modifications will be apparent to and can be readily made by those skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A device for enabling a communication between a Base Station, BS, and one or more User Equipment, UE, comprising a first sheet comprising one or more elements for interacting with one or more signals in the form of Electromagnetic waves, EM, a controller circuitry, wherein the controller circuitry comprises a memory and a processor, the memory comprising instructions which when executed by the processor cause the device to:

receive from the BS, a first message comprising a first configuration information for the device;

obtain, using a Machine Learning, ML model, a second configuration information for the device based on at least the first configuration information and a first power division factor;

configure the first sheet based on the second configuration information to divide the energy propagated by an incident signal in the form of an EM wave into a first energy and a second energy, wherein the first energy is propagated as a reflected signal in the form of another EM wave towards a UE and the second energy is stored, wherein the second configuration information comprises an amplitude of the reflected signal per element of the first sheet; and send, to the BS, a second message comprising the second configuration information.

2. The device according to claim 1, wherein the controller circuitry comprises a memory and a processor, the memory comprising instructions which when executed by the processor cause the device to determine, by using an energy threshold value configured in the device, an amount of the second energy that is used to power the device.

3. The device according to claim 1, wherein the controller circuitry-comprises a memory and a processor, the memory comprising instructions which when executed by the processor cause the device to power the device using the second energy that is stored.

4. The device according to claim 1, wherein the second energy is stored in an energy storage unit in the device.

5. The device according to claim 1, wherein the second energy is stored in the BS.

6. The device according to claim 1, wherein the controller circuitry comprises a memory and a processor, the memory comprising instructions which when executed by the processor cause the device to divide the energy into the first energy and the second energy using a power divider unit.

7. The device according to claim 1, wherein the controller circuitry comprises a memory and a processor, the memory comprising instructions which when executed by the processor cause the device to divide the energy into a first energy and the second energy using a first power division factor controllable by the controller circuitry.

8. The device-according to claim 1, wherein the controller circuitry comprises a memory and a processor, the memory comprising instructions which when executed by the processor cause the device to divide the energy into a first energy and the second energy using a first power division factor received from the BS.

9. The device according to claim 1, wherein the first power division factor is included in the first message.

10. The device-according to claim 1, wherein the first configuration information comprises at least one of the following:

Transmission, Tx, and Reception, Rx, Power of the UE;

Tx and Rx power of the BS;

Interference levels at the UE-including Received Signal Radio Quality, RSRQ;

Interference levels at the BS-including Received Signal Radio Quality, RSRQ;

UE Identity, ID, and UE geographical location;

BS ID and BS geographical location;

Target Quality of Service, QoS, requirements;

Number of UE antenna and polarization information of each antenna;

Number of BS antenna and polarization information of each antenna;

Possible scheduling time of the UE;

Data traffic information; and

Scatter ratios of the one or more elements-comprised in the first sheet.

11. The device according to claim 1, wherein the controller circuitry comprises a memory and a processor, the memory comprising instructions which when executed by the processor cause the device to obtain the second configuration information using, the ML model.

12. The device according to claim 1, wherein the controller circuitry comprises a memory and a processor, the memory comprising instructions which when executed by the processor cause the device to obtain the second configuration information using the ML model, wherein the first configuration information and the first power division factor are inputs to the ML model.

13. The device according to claim 1, wherein the controller circuitry comprises a memory and a processor, the memory comprising instructions which when executed by the processor cause the device to obtain, from the BS, the second configuration information as an output of the ML model executed on the BS, wherein the first configuration information and the first power division factor are inputs to the ML model.

14. The device according to claim 1, wherein the second configuration information is at least one of the following:

phase shift of the reflected signal per element of the first sheet;

second power division factor.

15. The device according to claim 1 wherein the device is a wireless device.

16. The device according to claim 1, wherein the BS is a gNodeB, gNB.

17. The device according to claim 1, wherein the incident signal and the reflected signal are Radio Frequency, RF, signal.

18. A method performed by a device for enabling a communication between a base station and at least a User Equipment, UE, comprising a first sheet comprising one or more elements for interacting with one or more signals in the form of Electromagnetic waves, EM, a controller circuitry, the method comprising:

receiving from the Base station, BS, a first message comprising a first configuration information for the device;

obtaining, using a Machine Learning, ML model, a second configuration information for the device based on at least the first configuration information and a first power division factor;

configuring the first sheet based on the second configuration information to divide the energy propagated by an incident signal in the form of an EM wave into a first energy and a second energy, wherein the first energy is propagated as a reflected signal in the form of another EM wave towards a UE and the second energy is stored, wherein the second configuration information comprises an amplitude of the reflected signal per element of the first sheet; and sending to the BS, the second configuration information.

19. A communication system comprising a device for enabling a communication between a base station and a UE comprising a first sheet comprising one or more elements for interacting with one or more signals in the form of Electromagnetic waves, EM, a controller circuitry; a Base Station, BS, communicating with a device for enabling a communication between the BS and a User Equipment, UE, the communication system configured to:

receive from a UE, a UE measurement report;

generate a first configuration information for a device based on at least the UE measurement report;

send to the device, a first message comprising the first configuration information;

receive from a Base station, BS, a first message comprising a first configuration information for the device;

obtain, using a Machine Learning, ML model, a second configuration information for the device based on at least the first configuration information and a first power division factor;

configure the first sheet based on the second configuration information to divide the energy propagated by an incident signal in the form of an EM wave into a first energy and a second energy, wherein the first energy is propagated as a reflected signal in the form of another EM wave towards the UE and the second energy is stored, wherein the second configuration information comprises an amplitude of the reflected signal per element of the first sheet;

send, to the BS, the second configuration information;

receive from the device, a second message comprising a second configuration information based on which the device is configured; and adapt the signal transmission of the BS towards the UE based on the second configuration information.

20. A non-transitory computer-readable storage medium containing a computer program comprising instructions which, when executed on a device, cause the device to carry out the method according to claim 18.

* * * * *